(12) United States Patent
Walthert et al.

(10) Patent No.: US 10,189,534 B2
(45) Date of Patent: Jan. 29, 2019

(54) SUSPENSION CONTROL FOR A HUMAN-POWERED TWO-WHEELED VEHICLE AND METHOD

(71) Applicant: DT SWISS INC, Grand Junction, CO (US)

(72) Inventors: Martin Walthert, Aarberg (CH); Valentin Wendel, Bern (CH); Gernot Elsensohn, St. Anton I. M. (AT); Juergen Poesel, Bludenz (AT); Markus Mayer, Sulz (AT); Stefan Battlogg, St. Anton I. M. (AT)

(73) Assignee: DT Swiss Inc., Grand Junction, CO (US)

( * ) Notice: Subject to any disclaimer, the term of this patent is extended or adjusted under 35 U.S.C. 154(b) by 289 days.

(21) Appl. No.: 15/158,044

(22) Filed: May 18, 2016

(65) Prior Publication Data

US 2016/0339987 A1 Nov. 24, 2016

Related U.S. Application Data

(60) Continuation-in-part of application No. 14/614,029, filed on Feb. 4, 2015, now Pat. No. 9,719,574, which
(Continued)

(30) Foreign Application Priority Data

Jun. 26, 2012 (DE) .......................... 10 2012 012 532
May 18, 2015 (DE) .......................... 10 2015 107 710

(51) Int. Cl.
*B62K 25/04* (2006.01)
*B62K 3/02* (2006.01)
(Continued)

(52) U.S. Cl.
CPC ................ *B62K 25/04* (2013.01); *B62K 3/02* (2013.01); *B62K 25/08* (2013.01); *B62K 25/286* (2013.01);
(Continued)

(58) Field of Classification Search
CPC combination set(s) only.
See application file for complete search history.

(56) References Cited

U.S. PATENT DOCUMENTS 4,949,573 A    8/1990   Wolfe et al.
5,276,623 A    1/1994   Wolfe
(Continued)

FOREIGN PATENT DOCUMENTS

DE    102006014833 A1   11/2006
DE       60320456 T2     6/2009
(Continued)

*Primary Examiner* — Thomas G Black
*Assistant Examiner* — Ana D Thomas
(74) *Attorney, Agent, or Firm* — Laurence A. Greenberg; Werner H. Stemer; Ralph E. Locher

(57) ABSTRACT

A chassis controller and method for controlling the damping of a human-powered two-wheeled vehicle having a controllable shock absorber and a control device and a memory device. A sensor device acquires measurement data sets relating to a relative movement of two connecting units of the shock absorber with respect to one another. A filter device pre-processes the measurement data sets. Multiple data sets are stored in the memory device. A data set, derived from a measurement data set acquired with the sensor device during the relative movement of the connecting units is stored and an analysis device analyzes a stored data set. A filter parameter set is determined based on the analysis, and a control data set is derived with the filter parameter set. The control device controls the shock absorber with the control data set.

24 Claims, 6 Drawing Sheets

Related U.S. Application Data is a division of application No. 13/927,874, filed on Jun. 26, 2013, now Pat. No. 9,051,988.

(51) Int. Cl.

| | | |
|---|---|---|
| *B62K 25/08* | (2006.01) | |
| *B62K 25/28* | (2006.01) | |
| *F16F 9/53* | (2006.01) | |
| *F16F 9/50* | (2006.01) | |
| *B62K 25/30* | (2006.01) | |

(52) U.S. Cl.
CPC ................ *F16F 9/50* (2013.01); *F16F 9/53* (2013.01); *F16F 9/535* (2013.01); *F16F 9/537* (2013.01); *B62K 25/30* (2013.01); *B62K 2025/044* (2013.01)

(56) References Cited

U.S. PATENT DOCUMENTS

| | | | |
|---|---|---|---|
| 6,049,746 A | 4/2000 | Southward et al. | |
| 6,952,637 B2 | 10/2005 | Barron et al. | |
| 7,308,975 B2 | 12/2007 | Nehl et al. | |
| 7,885,740 B2 | 2/2011 | Izawa et al. | |
| 7,942,248 B2 | 5/2011 | St. Clair et al. | |
| 8,151,952 B2 | 4/2012 | Nieder-Vahrenholz et al. | |
| 8,770,357 B2 | 7/2014 | Sims et al. | |
| 9,051,988 B2 | 6/2015 | Battlogg et al. | |
| 9,902,460 B2 * | 2/2018 | Walthert | B62K 25/04 |
| 2005/0113997 A1 | 5/2005 | Kim | |
| 2007/0257408 A1 * | 11/2007 | St.Clair | B60G 99/002 267/64.28 |
| 2011/0017555 A1 | 1/2011 | Battlogg et al. | |
| 2011/0127706 A1 | 6/2011 | Sims et al. | |
| 2012/0085606 A1 | 4/2012 | Walthert et al. | |
| 2012/0160621 A1 * | 6/2012 | Battlogg | B60G 17/08 188/267.2 |
| 2012/0166044 A1 * | 6/2012 | Battlogg | B62K 25/04 701/37 |
| 2012/0186921 A1 * | 7/2012 | Battlogg | F16F 9/182 188/267.1 |
| 2012/0186922 A1 * | 7/2012 | Battlogg | B62K 25/04 188/267.1 |
| 2012/0313020 A1 * | 12/2012 | Battlogg | F16F 9/537 251/65 |
| 2013/0175132 A1 * | 7/2013 | Battlogg | F16D 37/02 192/21.5 |
| 2013/0341138 A1 * | 12/2013 | Battlogg | F16F 9/535 188/267.1 |
| 2013/0341843 A1 * | 12/2013 | Battlogg | B62K 25/04 267/140.14 |
| 2014/0062057 A1 * | 3/2014 | Battlogg | B62K 25/08 280/276 |
| 2015/0061241 A1 * | 3/2015 | Walthert | B62K 23/02 280/5.504 |
| 2015/0175236 A1 * | 6/2015 | Walthert | B62K 25/04 280/5.515 |
| 2016/0339987 A1 * | 11/2016 | Walthert | B62K 25/04 |
| 2016/0339988 A1 * | 11/2016 | Mayer | B62K 25/04 |
| 2016/0339989 A1 * | 11/2016 | Walthert | B62K 25/04 |
| 2016/0339990 A1 * | 11/2016 | Walthert | B62K 25/04 |
| 2017/0002889 A1 * | 1/2017 | Battlogg | B60N 2/24 |
| 2017/0096040 A1 * | 4/2017 | Kurita | B62K 25/04 |
| 2018/0147074 A1 * | 5/2018 | Battlogg | A61F 2/68 |

FOREIGN PATENT DOCUMENTS

| | | |
|---|---|---|
| DE | 102008003920 A1 | 7/2009 |
| DE | 102012012532 A1 | 1/2014 |

\* cited by examiner

SUSPENSION CONTROL FOR A HUMAN-POWERED TWO-WHEELED VEHICLE AND METHOD

CROSS-REFERENCE TO RELATED APPLICATION

This application is a continuation-in-part of our copending patent application Ser. No. 14/614,029, filed Feb. 4, 2015, which was a divisional of patent application Ser. No. 13/927,874, filed Jun. 26, 2013, now U.S. Pat. No. 9,051,988; this application also claims the priority of German patent applications DE 10 2015 107 710.8, filed May 18, 2015, and DE 10 2012 012 532.1, filed Jun. 26, 2012; the prior applications are herewith incorporated by reference in their entirety.

BACKGROUND OF THE INVENTION

Field of the Invention

The present invention relates to a chassis controller and to a method for an at least partially human-powered two-wheeled vehicle and, in particular, a bicycle having at least one controllable shock absorber.

Shock absorption has a large influence on the riding properties and therefore constitutes an important feature of bicycles and, in particular, racing bicycles. Shock absorbers permit improved ground contact and permit sporty riding even in extreme off-road conditions. Bicycles with shock absorption generally have a suspension fork which is frequently supplemented with a rear wheel damper. A shock absorber usually comprises a spring device for absorbing shocks which occur and a damping device for damping the spring oscillation. In the case of shock absorbers for the rear wheel, the spring device and the damper device are generally embodied as an integral unit. In the case of suspension forks, the damping device and the spring device of the shock absorber can also be arranged separately.

The setting of the damping and spring properties is generally indispensable for the optimum utilization of the advantages of shock absorption. Criteria for the setting here are, for example, the weight of the bicycle and of the rider, and his riding style as well as the properties of the terrain in which the bicycle is to be ridden. Different damping properties are appropriate when riding on an even underlying surface than when riding off-road. In order to make available optimum damping properties at any time, electrically controllable shock absorbers for bicycles have become known which permit comfortable adjustment of the damping properties at any time.

DE 10 2012 012 532 A1 by the applicant has disclosed a shock absorber and a method for operating a shock absorber, in which the damper device comprises a controllable damping valve having a field-generating device with which a field-sensitive medium, such as a magneto-rheological fluid can be influenced in order to influence the damping force of the damper device by applying a field strength of the field-generating device. In this known shock absorber, the damping force of the damper device is set in real time. For this purpose, events in the form of shocks are detected, and a relative speed of the ends of the damper is acquired periodically. For the purpose of damping, a characteristic value is derived from the relative speed and in turn a field strength which is to be adjusted is derived from a damper characteristic curve with the characteristic value. The field strength which is to be adjusted is generated in real time with the field-generating device in order to adjust the damping force automatically in a direct fashion. With this known shock absorber, it is possible to deal with all types of shocks in a flexible fashion, since after the detection of relative movement the shock absorber is set directly.

The known shock absorber functions very reliably and switches within a few milliseconds, with the result that the damper device is continuously adapted to the currently prevailing conditions when a root or a stone is traveled over. While, for example, when traveling on an even underlying surface the damper remains at a hard setting, drive energy is therefore not unnecessarily dissipated in the damper device. The shock absorber operates very satisfactorily at least in principle. However, it has become apparent that in many situations, if, for example, the suspension fork experiences slow manual spring compression, the shock absorber is not deflected in a soft fashion, which it should permit at a low spring compression speed, but instead outputs a scratching or scraping feedback to the user's hand. A similar scratching or scraping sensation can sometimes be felt by the user in his palms which rest on the handlebars when he rides along a virtually completely even road. In contrast, when genuine shocks occur, such things do not occur and the shock absorber damps as expected in the case of relatively strong and also in the case of relatively weak shocks. The "scratching" or "scraping" or "rattling" occurs perceptibly at quite low loads. When manual spring compression occurs, the impression can arise that the shock absorber does not react quickly enough, and during the damping process a periodic transition takes place between very short active blocking and release and therefore "scratching" spring compression. The resulting resonance can be felt by the user. The shock absorbers on the rear wheel or also front wheel (suspension fork) are not deflected as gently as they should be when such slowly effected spring compression processes occur.

In order to remedy this, the measurement data have been filtered, which, however, gives rise to considerable delay during the reaction of the shock absorber, as a result of which shocks have been damped too late, and large shocks have not been damped in good time. In order to prevent a delay during the reaction of the shock absorber, the measuring frequency has been increased in order to obtain the correct reaction of the shock absorber at any time and therefore obtain a softer transition in all regions, on the basis of a more rapid sequence of the measured values. However, increasing the measuring frequency did not improve the spring compression and spring extension behaviors either. And this was the case even though the shock absorber could be adjusted within a few milliseconds.

BRIEF SUMMARY OF THE INVENTION

Therefore, the object of the present invention is to make available a chassis controller with which an improved response behavior of a controllable shock absorber is made possible.

This object is achieved by means of a chassis controller having the features as claimed and by means of a method for controlling a chassis of a two-wheeled vehicle as claimed. Preferred developments are the subject matter of the dependent claims. Further advantages and features of the present invention emerge from the general description and the description of the exemplary embodiments.

A chassis controller according to the invention for an at least partially human-powered two-wheeled vehicle has at least one controllable shock absorber and at least one control device and at least one memory device. The shock absorber comprises two connecting units which can move relative to one another, wherein at least one sensor device is provided for acquiring measurement data sets at least relating to a relative movement of the connecting units with respect to one another. The sensor device is designed to acquire a travel signal with a resolution of better than 100 µm. The sensor device is designed to acquire the travel signal with a frequency of higher than 1 kHz. A multiplicity of data sets can be stored in the memory device. A filter device is provided for pre-processing the measurement data sets. The filter device can also process further data sets and use them to pre-process the measurement data sets. At any rate, the filter device for performing pre-processing also processes measurement data sets. At least one data set, derived from a measurement data set acquired with the sensor device during the relative movement of the connecting units which can move relative to one another, is stored in the memory device. An analysis device is provided which is designed and configured to analyze at least one stored data set and to determine a filter parameter set as a function of the result of the analysis and to derive a control data set from the measurement data set with the filter parameter set, with the result that the control device controls the shock absorber at least also with the control data set.

The chassis controller according to the invention has many advantages. A considerable advantage of the chassis controller according to the invention is that the acquired measurement data sets are analyzed with the analysis device, with the result that a filter parameter set is determined as a function of the result of the analysis and is used to derive a control data set from the measurement data set. As a result, by analyzing the measurement data sets of the relative movement of the connecting units which can move relative to one another, in each case a suitable filter parameter set is obtained in order to ensure a rapid and, in all situations, sufficiently soft response behavior of the shock absorber.

The term data set is understood in the sense of the present invention to mean a data set with at least one value or measured value contained therein. It is also possible and preferred for a data set to contain a plurality of different values or parameters. A measurement data set can therefore contain, for example, travel information and speed information and also acceleration information and the like. However, it is also possible for a measurement data set to contain only a single measured value. The same also applies to a derived data set which is stored in the memory device and also to a control data set which is obtained from the stored data set and/or the measurement data set. In a similar way, a filter parameter set can contain one or more filter parameters. A parameter set preferably comprises a plurality of parameters. However, it is also possible for a parameter set to contain just one parameter.

A derived data set which is stored in the memory device is also referred to below as a "stored data set". The derived and stored data set can be identical to the associated measurement data set or is acquired therefrom by pre-processing. For example, standardization can be carried out.

In particular, the control device is designed and configured to analyze at least one stored data set and to determine a filter parameter set as a function of the result of the analysis from a plurality of filter parameter sets and to derive a control data set from the measurement data set with the obtained filter parameter set. In particular, the filter device filters measurement data less intensively when a more intensive relative movement of the connecting units with respect to one another occurs. A more intensive relative movement is understood to be a relatively rapid relative movement or a relatively rapid acceleration relative to one another or, if appropriate, also an absolute speed or acceleration. In contrast, in the case of a less intensive relative movement of the connecting units with respect to one another, filtering is carried out more intensively. This means stronger denoising is carried out on the measurement data or the value or the values of a measurement data set. As a result, a smoother time sequence can be made available.

The control device controls the shock absorber indirectly or directly by using further components such as (power) electronics and, in particular, by using a magnetic field-generating device. At any rate, the damping of the shock absorber is adjusted with the control data set.

Pre-processed data sets are obtained from the measurement data sets by pre-processing and/or by pre-filtering and/or by filtering, which are preferably used for the basis for further processing. The filter device can be part of the control device.

The measurement data sets are preferably measured with a frequency which is higher than 200 Hz or 500 Hz and, in particular, higher than 1 kHz. Both the current measurement data set and at least one preceding measurement data set or at least the current derived data set and/or a previously derived data set can be stored in the memory device. It is also possible and preferred for the respectively current control data set to be stored in the memory device.

Different options are produced for the respective pre-processing of the measurement data. During a first pass, a pre-set filter parameter set is preferably loaded and at least one first measurement data set is adopted. At first, a control data set with the pre-set filter parameter set is derived from the measurement data set.

Afterwards, according to a first variant a new or current measurement data set is adopted in a loop. Subsequently, a filter parameter set is selected or derived using the preceding control data set. A current control data set is derived with the filter parameter set which has been determined in this way. The damping of the shock absorber is adjusted taking into account this control data set or with this control data set.

During the next pass through the loop, the previously still current measurement data set becomes the preceding measurement data set. The current measurement data set is adopted. A filter parameter set is selected using the control data set of a preceding loop and, in particular, the last loop, and a current control data set is derived with the current measurement data set and the selected filter parameter set, and said current control data set is subsequently used to adjust the damping.

In an alternative method, after the first pass another loop can be run through. In this context, firstly a current measurement data set is also adopted. Using the current measurement data set, a filter parameter set is selected, and a current control data set is derived from the current measurement data set with the selected filter parameter set. Afterwards, the damping is adjusted taking into account the current control data set. The filter parameter set can also possibly be obtained iteratively. In this context, a renewed partial loop pass for obtaining the filter parameter set is carried out if the currently obtained control data set deviates from the preceding control data set by a certain degree or if the control data set or the values contained therein undershoot or exceed specific limits.

Furthermore, a further variant of the loop is possible according to which firstly a current measurement data set is adopted, and a current control data set is derived with the current measurement data set using the preceding filter parameter set. On the basis of the control data set, it is subsequently checked whether the correct filter parameter set has been selected. The filter parameter set is possibly newly selected, and a new control data set or current control data set is newly derived. It is in turn also possible for checking as to whether the correct filter parameter set has been selected to take place here. This iteration loop can be carried out as frequently as desired. Preferably, the iteration loop is limited in its number in order to avoid a continuous loop. Finally, the damping is adjusted with the current control data set.

In one preferred development, a multiplicity of filter parameter sets are stored in the memory device, and a filter parameter set can be selected as a function of the at least one stored data set.

The stored data set can in all cases be the measurement data set in the form in which it was adopted. However, it is also possible for the acquired measurement data set to be pre-processed in a first pre-processing step with the sensor device, in order, for example, to obtain standardized values and subsequently store the data set obtained in this way in the memory device. A multiplicity of data sets which have been measured and pre-processed with one another are preferably stored in the memory device. Depending on the storage capability, an FIFO method can be selected, with the result that a number of the last measurement data sets remain in each case in the memory device.

In particularly preferred developments, the analysis device comprises a comparator device and the comparator device compares a stored data set with comparison data and selects, as a function of the result of the comparison, a filter parameter set stored in the memory device or derives a filter parameter set, and said comparator device derives a control data set from the measurement data set with the filter parameter set. Such a configuration is very advantageous since very precise results can be achieved without complex computing operations.

A filter parameter set can preferably be selected as a function of the at least one stored data set. This means that a filter parameter set can be selected as a function of the content of at least one stored data set. Accordingly, a content of a stored data set can be compared with comparison data using the comparator device.

In all the configurations it is preferred that a multiplicity of data sets can be stored in the memory device. This includes not only the original measurement data sets but also the data sets derived therefrom and stored in the memory device, as well as the control data sets which can be stored in the memory device and, if appropriate, further similar data sets.

It is particularly preferred for the sensor device to be designed to acquire at least one travel signal. In advantageously developments, the control device is designed to derive a speed signal for a relative movement of the connecting units from a sensor signal of the sensor device. For this purpose, a computing unit is provided which can be part of the control device. The control device is preferably designed also to derive an acceleration signal from a sensor signal of the sensor device. In particular, the control device is designed and configured to derive an acceleration signal of the required quality from a sensor signal. For this purpose, the control device determines the acceleration signal from the sensor signal at a frequency of preferably greater than 1 kHz. In order to calculate the acceleration signal, a computing unit which can also be part of the control device is also preferably provided. The same computing unit can be used to calculate the acceleration signal and the speed signal.

The control device is preferably designed to derive a speed signal and an acceleration signal for a relative movement of the connecting units from a sensor signal of the sensor device. In particular, the travel signal of the sensor device is used for this purpose.

The control device is preferably designed to select a filter parameter set with stronger filtering in the case of speed signals and acceleration signals which are low in absolute value. The control device is preferably designed to select a filter parameter set with less filtering in the case of speed signals or acceleration signals which are relatively high in absolute value. This means that a filter parameter set with relatively strong filtering is selected if the speed signal and acceleration signal are small. A filter parameter set with relatively low filtering is selected even if only one of the two signals, specifically the speed signal and the acceleration signal, is greater. As a result, a very rapid reaction is ensured in the case of shocks, while stronger smoothing takes place in the case of small signals. However, when there is a strong shock, the reaction thereto is prevented from occurring only when it is (too) late. As a result, the "rattling" or "scratching" can be very reliably avoided.

Such rattling occurs, as has become apparent, in particular when the speed signal is below 10%, and more likely below 5% of the typical maximum speed signal during operation. If, in the event of a powerful shock, the maximum speed signal which occurs is, for example, approximately 0.5 m/s or 1 m/s, "scratching" can occur, in particular in the case of speed signals of up to 0.05 or 0.02 m/s. Here, in the case of speed signals which are below a predetermined limit, filtering is carried out more strongly, with the result that stronger denoising is carried out. In contrast, in the case of speed signals above the latter, filtering is carried out less strongly or not at all. However, if relatively large acceleration signals above a predetermined limit are obtained, the speed signal is filtered less intensively even in the case of a low absolute value. An optimum result is achieved by means of this combination. In the case of strong signals, little filtering (or none at all) is carried out, with the result that the speed signal is (almost) used directly to adjust the damping. This is advantageous, since in the case of such real-time damping (in the case of "real" shocks), any delay can be disadvantageous. In the case of slight shocks or vibrations which generate small speed signals and acceleration signals, stronger filtering, and in particular smoothing, is carried out. A delay is not particularly significant in the case of low loads.

The sensor device is advantageously suitable for acquiring, and designed to acquire, the travel signal with a resolution of better than 100 μm. The resolution of the travel signal can also be better than 50 μm or better than 30 μm and preferably better than 10 μm. With a sensor device which acquires travel signals with very high resolution, very precise control of the chassis can be carried out.

In particular, the sensor device is suitable for acquiring, and designed to acquire, the sensor signal with a measuring frequency of at least 500 Hz or at least 1 kHz. In this context, the measuring frequency can also reach or exceed 5 kHz.

In particularly preferred developments, the damper device comprises a first damper chamber and at least one second damper chamber. In this context, the first damper chamber and the second damper chamber are coupled to one another via at least one, in particular controllable, damping valve. The at least one damping valve or at least one damping valve is assigned at least one magnetic field-generating device which serves to generate and control a magnetic field in at least one damping duct of the damping valve. At least one magneto-rheological medium is particularly preferably provided in the damping duct. Using a magneto-rheological medium in the damping duct at least one property of the shock absorber can be adjusted individually and rapidly by actuating the magnetic field-generating device. Complete resetting of the damper force of the damper device or of the shock absorber can be carried out within a few milliseconds.

The method according to the invention serves to control at least part of a chassis of an at least partially human-powered two-wheeled vehicle, and has at least one control device and at least one memory device and at least one controllable shock absorber. The controllable shock absorber comprises two connecting units which can move relative to one another. The sensor device acquires a travel signal with a resolution of better than 100 µm and with a frequency of higher than 1 kHz. Measurement data sets relating to a relative movement of the connecting units with respect to one another are acquired and pre-processed with a filter device. In this context, a data set is derived from an acquired measurement data set and stored in a memory device. A multiplicity of data sets are stored in the memory device. At least one stored data set is analyzed, and a filter parameter set is determined as a function of the result of the analysis, and a control data set is derived from the measurement data set with the filter parameter set, with the result that the shock absorber is controlled using the control data set or with the control data set.

The method according to the invention also provides a large number of advantages, since it carries out pre-processing which is adapted as a function of the analysis of the measurement data, as a result of which suitable damping parameters are set at any time.

In preferred developments, at least one speed signal or speed data are derived from the measurement data set. At least one acceleration signal or acceleration data can likewise be derived from the measurement data set.

In preferred developments, a measurement data set or at least one value of a measurement data set is filtered relatively strongly when the absolute value of the respective value of the measurement data set is lower, and is filtered relatively strongly when the absolute value of the value or values of the measurement data set is higher. In order to differentiate whether relatively strong or relatively weak filtering is carried out, it is possible to provide threshold values or a limiting value set. The values of the measurement data set can contain travel values, acceleration values and/or speed values. Filtering can also be understood to mean smoothing the values. The term "absolute value of the values" is understood to mean the mathematical absolute value—that is to say the value without a sign.

In particular, in this context stronger filtering is carried out in the case of low speeds of the relative movement than in the case of high speeds, in particular the speed signal is taken into account in order to decide whether stronger or weaker filtering is carried out.

Likewise, it is preferred that in the case of low accelerations of the relative movement stronger filtering is carried out than in the case of high accelerations or high acceleration signals.

The term "stronger" filtering is understood here to mean more intensive filtering. This means that more intensive denoising is carried out on more strongly filtered measurement data. This can take place, for example, by virtue of the fact that a larger number of preceding measurement data items are taken into account or by preceding measurement data being taken into account with higher weighting. Relatively strong filtering brings about stronger smoothing than relatively weak filtering. This gives rise to a lower cut-off frequency. Edges are rounder in the case of relatively strong filtering than in the case of relatively weak filtering during which the cut-off frequency is higher. Relatively strong filtering brings about, in particular, stronger denoising than relatively weak filtering. Speed signals and acceleration signals are particularly preferably taken into account in order to decide how strongly filtering will be carried out. If the speed signal exceeds a predetermined speed limit or if the acceleration signal exceeds a predetermined acceleration limit, weaker filtering is carried out than if the speed signal and acceleration signal are smaller than the respective limit.

It has been found that in the case of high speeds and/or high accelerations, significantly weaker pre-processing is necessary than in the case of low accelerations or low speeds. In the case of high accelerations and/or speeds which occur when obstacles are traveled over, low filtering or smoothing is sufficient or can be completely dispensed with. In contrast, in the case of small or very small shocks, mostly only a low acceleration and a low relative speed between the connecting units of the shock absorber occur. Here, noise is already produced in conjunction with a limited spatial and speed resolution and the digitization (i.e. the discretization of time and the discretization of values) of the measurement result owing to the principle, so that the measured values do not always bring about a satisfactory mode of operation of the shock absorber without further pre-processing. Raising the measuring frequency then even causes the noise to be increased, since in the case of relatively high measuring frequencies relatively small changes in value are still obtained in each case between individual measurements. Therefore, any desired increase in the measuring frequency does not lead to an improvement in the measurement result but rather can be counter-productive, at any rate, if the resolution of the sensor device is not correspondingly also increased. Since the invention relates to a chassis controller and a method for an at least partially human-powered two-wheeled vehicle and in particular a bicycle with at least one controllable shock absorber, in which the control of the chassis takes place, in particular, in real time, the measuring frequency must be so high that at any time it is possible to react sufficiently quickly to any expected events. Therefore, when a shock occurs when traveling over, for example, a root, or in the event of a jump, a damper device must react quickly, and perform the appropriate damper adjustment, in such a way that in each case optimum, or at least sufficient, damping properties are brought about. Such time requirements are usually not found nowadays in motor vehicles, since in them a shock is not damped in real time but instead only the general damper setting is changed. Here, the damper setting is adapted repeatedly during a shock, in order to obtain the respective optimum damper settings. Therefore, the measuring frequency and the regulator frequency of the control device must be correspondingly high, in order to implement the concept in the case of high dynamics.

At least a plurality of successively acquired data sets are preferably stored in the memory device. As a result, a plurality of previously acquired data sets can be accessed for the pre-processing of the current measurement data set. This permits, for example, sliding smoothing of the measurement data over a plurality of data sets, e.g. over 2, 3, 4, 5, 6, 8 or 10 data sets. As a result, a significant reduction in the digital noise and the noise overall is achieved.

In the case of particularly high measuring frequencies (e.g. 20 kHz or 50 kHz or 100 kHz or more), averaging of a certain number of measurements can also be carried out, and the mean value of a plurality of measurements (e.g. 2, 3 or 5 or 10) is output as a measurement data set. Such "oversampling" can be carried out both using software or hardware. It is important that the output rate of the measurement data sets is sufficiently fast.

A strength or intensity of the smoothing preferably depends on the stored data set. In particular, a strengthening of the smoothing depends on the current data set. It is possible and preferred here that, for example in the case of sliding averaging, the number of data sets used for the averaging is varied. If, for example, relatively strong filtering is desired, the smoothing can be carried out over a correspondingly larger number of successively adopted data sets, while in the case of relatively weak filtering a correspondingly smaller number of data sets are taken into account for the averaging.

It is also possible and preferred that the proportional factors for smoothing averaging are varied as a function of the strength of the desired filtering. In the case of relatively strong filtering, for example, adjacent or preceding measured values can be taken into account with the same weighting or similar weighting as the current measured value. For example, for relatively strong filtering, 20% of the current measured value and the preceding 4 values (or respectively 10% of the current measured value and the preceding 10 values) can be taken into account. In contrast, in the case of relatively weak filtering (fewer measured values and) measured values which are spaced further apart in terms of timing are taken into account with a lower proportional factor. For example, in the case of relatively weak filtering 75% of the current measured value and 25% of the preceding measured value can be taken into account. Alternatively, respectively 50% of the current measured value and of the one before it is taken into account, while in the case of relatively strong filtering the current measured value and the two measured values before it are respectively taken into account with the same weighting (33%).

In addition to filtering over sliding average values, IIR (Infinite Impulse Response) filters or FIR (Finite Impulse Response) filters or other filters can be used. The use of a Kalman filter is also preferred, in which case at least one parameter of the Kalman filter is then varied with the strength of the filtering.

In all configurations, it is particularly preferred if the sensor device is used to acquire measurement data sets with a measuring frequency of higher than 250 Hz (in particular 500 Hz and preferably 1 kHz) and/or the control device determines control data sets with a control frequency of higher than 250 Hz (in particular 500 Hz and preferably 1 kHz). The shock absorber is preferably at least temporarily actuated with at least this control frequency of 250 Hz (in particular 500 Hz and preferably 1 kHz). The measuring frequency and the control frequency are particularly preferably each >2 kHz. The measuring frequency and/or the control frequency are preferably higher than 5 kHz.

The sensor device particularly preferably acquires travel signals with a resolution of less than 100 µm or less than 50 µm. Preferably, a resolution of less than 30 µm and particularly preferably less than 10 µm is achieved. As a result, high-resolution relative movements can be determined, which increases the accuracy.

In all configurations, it is particularly preferred if the measuring frequency and the control frequency are at least temporarily higher than 8 kHz and the resolution of the travel signals is at least temporarily less than 10µ or 5 µm. In this context, it is particularly preferred if the measuring frequency is less than 50 kHz and preferably less than 20 kHz or if the outputting of measurement data sets takes place at a frequency of less than 50 kHz and preferably less than 20 kHz.

It is also possible and preferred that the measuring frequency and the control frequency are different. The measuring frequency is preferably higher than the control frequency. The control frequency is preferably higher than 50 Hz and, in particular, higher than 100 Hz and preferably higher than 250 Hz or higher than 500 Hz. The measuring frequency is, in particular, higher than 250 Hz and preferably higher than 500 Hz and particularly preferably higher than 1 kHz. A ratio of the measuring frequency to the control frequency can be higher than 2 and, in particular, higher than 4 and preferably higher than 8 or 16.

Overall, the invention makes available an advantageous method and an advantageous chassis controller, as a result of which an adapted and respectively smooth response behavior is made possible in all load ranges. Surprisingly, the desired result was not obtained by increasing the measuring frequency but rather by analyzing the respective measured values and by carrying out filtering as a function of the respective measured values. It has in fact been found that the recording of measured values was previously not too slow but rather too fast in the case of low damper speeds, since owing to the inevitably occurring noise, which is caused at least partially also by digitization effects, the relative errors also increase as the measuring frequency increases at low rates of change of the measurement variables, for which reason the shock absorber adjusted the noisy values too quickly owing to its high reaction speed. In contrast, in the case of particularly strong shocks, the measured values change from one step to the next with such a speed that no appreciable errors are introduced as a result of the digitization.

It has also proven advantageous to increase the measuring accuracy and/or the measuring resolution. It is particularly advantageous to adapt the measuring resolution and measuring frequency to one another and filter the measurement data after analysis of the measurement data. In this context, the evaluation takes place in real time.

Further advantages and features of the present invention are apparent from the exemplary embodiments which are explained with reference to the appended figures.

DESCRIPTION OF THE INVENTION

Exemplary embodiments and variants of the invention relating to a chassis controller 300 with a damper device 1 for a bicycle are described with reference to the appended figures.

Figure 1:
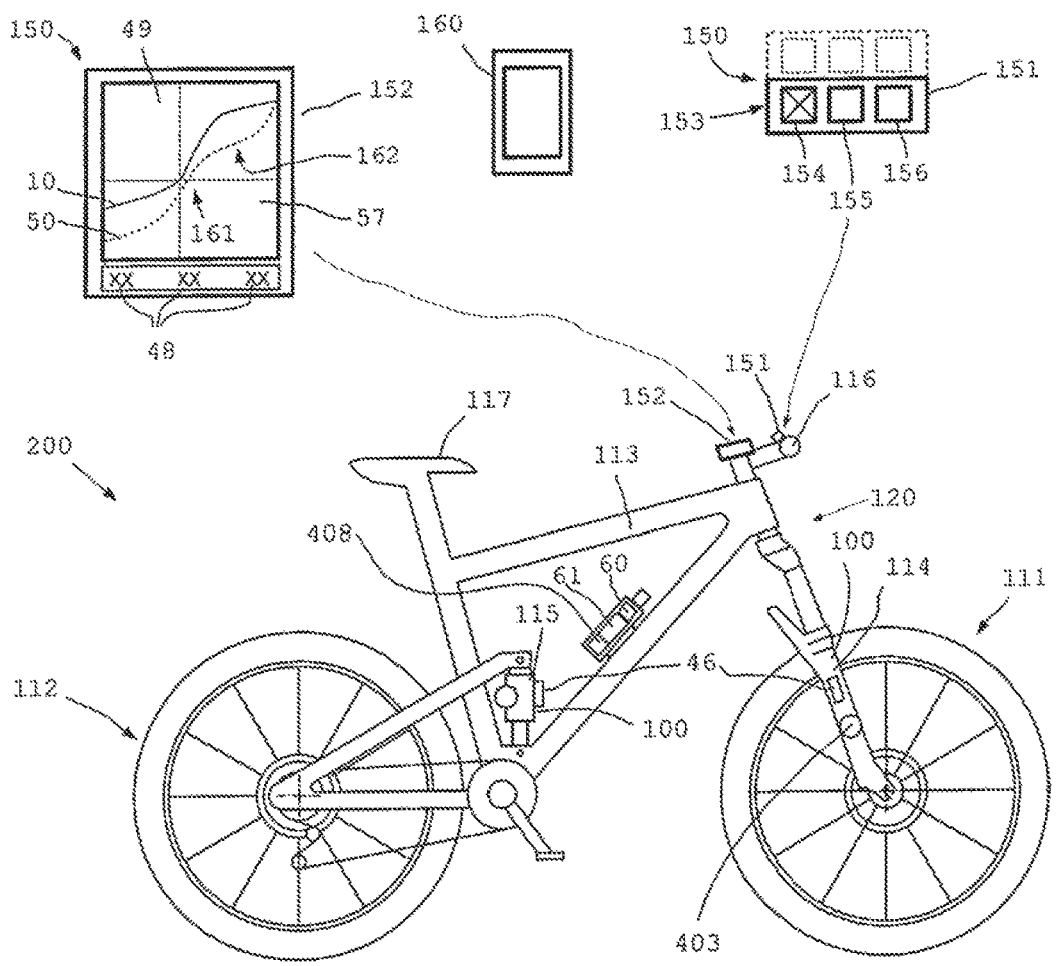
FIG. 1 shows a schematic illustration of a bicycle with a chassis controller according to the invention.

FIG. 1 shows a schematic illustration of a bicycle 200 which is embodied here as a mountain bike and has a frame 113 and a front wheel 111 and a rear wheel 112. Both the front wheel 111 and the rear wheel 112 are equipped with spokes and can have the illustrated disk brakes. A gearshift serves to select the transmission ratio. Furthermore, the bicycle 200 has a steering device 116 with handlebars. Furthermore, a saddle 117 is provided.

The front wheel 111 has a shock absorber 100 which is embodied as a suspension fork 114 and a shock absorber 100 which is embodied as a rear wheel damper 115 is provided on the rear wheel 112.

The chassis controller 300 comprises, in the simplest case, a shock absorber 100 and a control device 46. It is also possible for the chassis controller 300 to comprise two shock absorbers 100 (suspension fork and rear wheel shock absorber), on each of which a control device 46 is provided. Alternatively, the chassis controller 300 comprises two shock absorbers 100 and a central control device 60. The chassis controller 300 particularly preferably comprises two shock absorbers 100 and a central control device 60 and, in each case, a control device 46 on each shock absorber. The (central) control device 60 can be used to make the pre-settings and to coordinate the two shock absorbers.

The central control device 60 is provided here together with a battery unit 61 in a drinking bottle-like container and is arranged on the lower tube, where otherwise a drinking bottle is arranged, but can also be arranged in the frame. The central control device 60 can also be arranged on the handlebars 116.

The central control device 60 is used here in the exemplary embodiment according to FIG. 1 to control the chassis and controls here both the suspension fork 114 and the rear wheel shock absorber 115, in each case separately and here, in particular, synchronously or in such a way that they are coordinated with one another.

The shock absorbers 100 and further bicycle components can be controlled as a function of a wide variety of parameters, essentially also on the basis of data acquired by sensor. If appropriate, the spring properties and/or damping properties of the saddle support can also be adjusted. It is possible that the central control device 60 can also be used to control the shifting operation for setting various transmission ratios. In particular, ageing of the damping medium, of the spring device and of further components can also be taken into account. It is also preferred to take into account the temperature of the shock absorber 100 (suspension fork 114 and/or rear wheel shock absorber 115). In this context, in particular the temperature of at least the damper device 1 can be taken into account.

In addition, each shock absorber 100 here has at least one control device 46 on an electronics unit which is provided here in a replaceable fashion. The electronics units can each have separate battery units. However, an energy supply by means of the central battery unit 61 or assistance or operation by means of a dynamo or the like is preferred.

The chassis controller 300 and the central control device 60 are operated by means of operator control devices 150. Two operator control devices 150 are provided, specifically an activation device 151 and an adjustment device 152. The activation device 151 has mechanical input units 153 at the lateral ends or in the vicinity of the lateral ends of the handlebars 116. The adjustment device 152 can be embodied as a bicycle computer and can also be positioned on the handlebars 116. However, it is also possible that a smart phone 160 or a tablet or the like is used as the adjustment device 152 and is stored, for example, in the user's pocket or backpack if the settings are not changed.

The activation device 151 comprises here three mechanical input units as operator control elements 154, 155, 156 for operating the shock absorber 100. It is possible that an activation device 151 for the suspension fork 114 is arranged at one end of the handlebars 116, and that a corresponding further activation device 151 for the rear wheel shock absorber 115 is provided at the other end of the handlebars. It is also possible that both shock absorbers are controlled synchronously with one activation device 151. It is also possible that an activation device with, for example, six different operator control elements for setting the two shock absorbers 100 is arranged at one lateral end of the handlebars 116.

The activation device 151 is embodied in a considerably more robust and resistant fashion than the operator control device 152 and is securely mounted on the handlebars 116 here. The individual operator control elements 154 to 156 embodied as press switches or pushbutton keys each have protection according to IP54 or better IP67 in accordance with DIN EN 60529. Protection is provided against shocks by at least IK06 according to DIN EN 622622. Therefore, the operator control elements 154 to 156 are sufficiently protected during normal operation, and therefore no damage occurs to the operator control elements during operation, even in the event of normal shocks or the like. Furthermore, the robust operator control elements 154 to 156 ensure there is a reliable operator control even during downhill travel or the like.

In contrast, the adjustment device 152, which is, for example, clipped onto the handlebars or remains in the user's pocket or backpack, provides considerably more and/or more easily comprehensible adjustment possibilities and can be used to adjust a displayed damper characteristic curve 10 in at least two or more regions 161, 162 etc. in order to set the desired damper properties. The adjustment device 150 has a display 49 and can also output data 48 which relate, for example, to the damper settings or else contain data relating to the current velocity etc. In addition to, or instead of, changing the damping, at least one spring property or the characteristic of the suspension can also be changed by means of the adjustment devices 150 or 152. In this context, in particular the spring hardness during spring compression and/or spring extension can be influenced. Furthermore, if appropriate the position of rest can be set. For example, the suspension fork 114 can be lowered in the case of (steep) uphill travel, as a result of which the angle of inclination of the bicycle 200 is reduced.

The display 49 is embodied, in particular, as a graphic operator control unit or touchscreen 57, and the user can therefore touch, for example, a displayed damper characteristic curve 10 with his fingers and change it by dragging movements. As a result, on the basis of the continuous damper characteristic curve 10 which is displayed it is possible to generate the damper characteristic curve 50 which is also displayed and which is then used immediately for the vehicle controller 300. It is also possible to change the damper characteristic curves 10, 50 while traveling. Here, not only the damping is changed but it is also possible to change the suspension at the same time or to change only the suspension.

The adjustment device 152 can also serve as a bicycle computer and display information about the current speed as well as about the average speed and/or the kilometers per day, kilometers for a tour or round and the total number of kilometers. It is also possible to display the current position, the instantaneous altitude of the section of route being traveled on and the route profile as well as a possible range under the current damping conditions.

Figure 2:
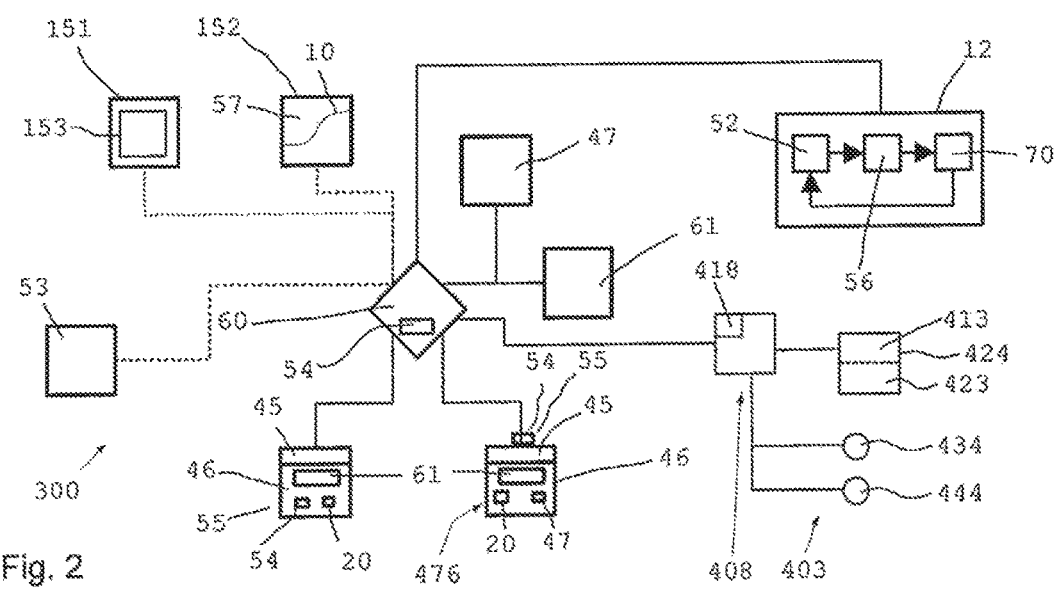
FIG. 2 shows a schematic illustration of the chassis controller.

FIG. 2 shows a schematic illustration of the chassis controller 300 and of the communication connections of a number of components which are involved. The central control device 60 can be connected in a wire-bound or wireless fashion to the individual components. For example, the control device 60 (or 46) can be connected to the other components via WLAN, Bluetooth, ANT+, GPRS, UMTS, LTE or other transmission standards. If appropriate, control device 60 can be connected in a wireless fashion to the Internet 53 via the connection illustrated by a dotted line.

The control devices 46 and 60 are connected to at least one sensor device 20 or to a plurality of sensors. The operator control devices 150, specifically the activation device 151 and the adjustment device 152, are coupled in a wire-bound or wireless fashion to the control device 60 at least temporarily. The activation device 151 is preferably coupled in a wireless or wire-bound fashion to the control device and can have a separate battery (e.g. button cell).

The robustly constructed activation device 151 has at least one mechanical input unit 153 in the form of a switch or pushbutton key or the like to be used for outputting a resetting command to the control device 60 for switching at least one damper property and/or spring property. This can be, for example, the activation of a lockout or the activation of a rocking suppression device or the adjustment of the damper hardness and/or the spring hardness. A separate operator control knob or the like is preferably provided for each of these properties. However, it is also possible for a single mechanical input unit 153 to be used for switching the individual possibilities. The mechanical input unit 153 or another mechanical input unit can be used to change the suspension properties. For example, the suspension fork can be lowered and the rear wheel damper correspondingly adapted.

The adjustment device 152 has here a graphic operator control unit such as a touch-sensitive screen and can display, inter alia, the current damper characteristic curve 10 on the display 49.

The control device 60 is connected to control devices 46 of the shock absorbers 100 on the front wheel and on the rear wheel via network interfaces 54 or radio network interfaces 55. The control device 46 which is possibly provided on each shock absorber 100 performs the local control and can have, in each case, a battery or else be connected to the central battery unit 61. It is preferred that both shock absorbers are controlled via the control device 60. It is also possible for the shock absorbers 100 to be controlled locally by means of assigned control device 46.

Each shock absorber 100 is preferably assigned at least one sensor device 20 in order to detect relative movements between the components or connecting units 101 and 102. In particular, a relative position of the components 101 and 102 relative to one another can be determined. The sensor device 20 is preferably embodied as a (relative) travel sensor or comprises at least one such sensor. It is also possible and preferred to use at least one additional acceleration sensor 47. The sensor device 20 can also preferably be embodied as a speed sensor or comprise such a sensor.

After the determination of a characteristic value for the relative speed, the associated damping force and an appropriate spring force are set on the basis of the damper characteristic curve 10, stored in the memory device 45, of the shock absorber 100. An appropriate spring force can be determined by means of the rider's weight. For example, the rider's weight can be derived by automatically determining the spring compression position (sag) after a rider gets on. A suitable air pressure in the fluid spring or gas spring can be inferred from the spring compression travel when the rider gets on the bicycle, which pressure is then adjusted or approximated automatically, immediately or in the course of operation.

Furthermore, a detection device 408 is provided which is integrated here into the central control device 60 and is used to detect difficulties in the terrain. The detection device 408 can, however, also be embodied separately and be accommodated at any desired suitable location on the bicycle 200. The detection device 408 is assigned a sensor unit 403 which comprises an ultrasound sensor 424 which is mounted on the suspension fork 114. The sensor unit 403 is connected here to the detection device 408 via a line (not shown) or in a wireless fashion. During operation, the sensor unit 403 outputs an ultrasound signal and receives its reflection. The detection unit 408 evaluates the received signal and in this way detects whether the source of the reflection is a difficulty in the terrain. In this context, the reflected signal is also evaluated, in particular, by the detection device 408 in such a way that it is possible to characterize the difficulty in the terrain. As a result of a detected or characterized difficulty in the terrain, the detection device 408 sends a corresponding control signal to the central control device 60. Image evaluation of the images of a camera is also possible.

In reaction to a detected difficulty in the terrain, the detection device 408 actuates, in conjunction with the central control unit 60, the second damper device, embodied as a rear wheel damper 115, with a time offset with respect to the suspension fork 114. The time offset between the actuation of the suspension fork 114 and the rear wheel damper 115 is also determined by the detection device 408 in conjunction with the control device 60 and as a function of the velocity. In order to determine the velocity, corresponding sensors are arranged on at least one of the wheels 111, 112 and operatively connected to the central control device 60. The velocity can also be determined by means of a GPS signal.

FIG. 2 is a schematic illustration of the control circuit 12 which is stored in the memory device 45 and stored or programmed in the control device 46 or 60. The control circuit 12 is carried out periodically and, in particular, in a continuously periodic fashion, during operation. In step 52, a current relative movement or relative speed of the first component or connecting unit 101 with respect to the second component or connecting unit 102 is detected with the sensor device 20. In step 52, a characteristic value which is representative of the current relative speed is derived from the values of the sensor device 20 or. A relative speed is preferably used as the characteristic value.

The damper device (cf. FIG. 3a or 3b) of the shock absorber 100 has a damper device 1 with a first and a second damper chamber, between which a damping valve is arranged. The damping valve has at least one damping duct 7 which is subjected to a magnetic field of an electrical coil device, in order to influence the magneto-rheological medium or fluid (MRF) in the damping duct 7 and in this way set the desired damping force. A damper characteristic curve can be taken into account during the setting of the damping force.

In step 56, the associated damping force which is to be set is then subsequently derived from the current measured values while taking into account the predetermined or selected damper characteristic curve. A measure of the field strength or current strength which is to be currently set, and with which the damping force which is to be set is at least approximately attained, is derived therefrom. The measure can be the field strength itself or else, e.g., indicate the current strength with which the damping force to be set is at least approximately attained.

In the following step 70, the field strength which is to be currently set is generated or the corresponding current strength is applied to the electrical coil device 11 as a field-generating device, with the result that the damping force which is provided with the selected or predetermined damper characteristic curve for the current relative speed of the first connecting unit 101 with respect to the second connecting unit 102 is generated within an individual cycle or a time period of the control circuit 12. Subsequently, the next cycle starts, and step 52 is carried out again. The position or the spring force of the spring device 42 is checked in each cycle or at specific time intervals or when specific events occur.

For this purpose, in the case of the fluid spring 260 (cf. FIG. 3a or 3b) the strength of the spring force of the positive chamber 270 and the strength of the spring force of the negative chamber 280 are checked or determined. If a relatively hard fluid spring 261 is desired, for example the second positive chamber 272 can be switched off, with the result that the fluid spring 260 is given a steeper profile of the spring force. Alternatively, the volume of the negative chamber 280 is changed, or a position 292 of the equalization device 290 is changed.

The central control device 60 shown here is additionally operatively connected to the suspension fork according to the invention or the handlebars. The bicycle component 401 is composed of the detection device 408 and an ultrasound sensor 424. The ultrasound sensor 424 can emit an ultrasound signal here and also receive this signal again. The sensor 424 therefore combines a transmitter unit 413 and a receiver unit 423 in one component. As a result, particularly inconspicuous and space-saving mounting is possible. This is particularly advantageous in the case of racing cycles in which greater value is placed on a low weight and good aerodynamic properties. In addition, the external appearance of the bicycle 200 is not adversely affected either.

Alternatively, the detection device 408 can also be connected to an infrared sensor 434. A radar sensor 444 can also be provided. The detection device 408 also has an integrated memory device 418 here. It is therefore possible to store the detected difficulties in the terrain and the damper settings made in response thereto. These can then be retrieved later, e.g. by a user via a corresponding interface such as e.g. a smart phone 160. Furthermore, the detection device 408 accesses data of a sensor device 20 here. The detection device 408 takes into account the acquired values of the sensor device 20 here in order to be able to monitor the damper loadfactor.

Figure 3A:
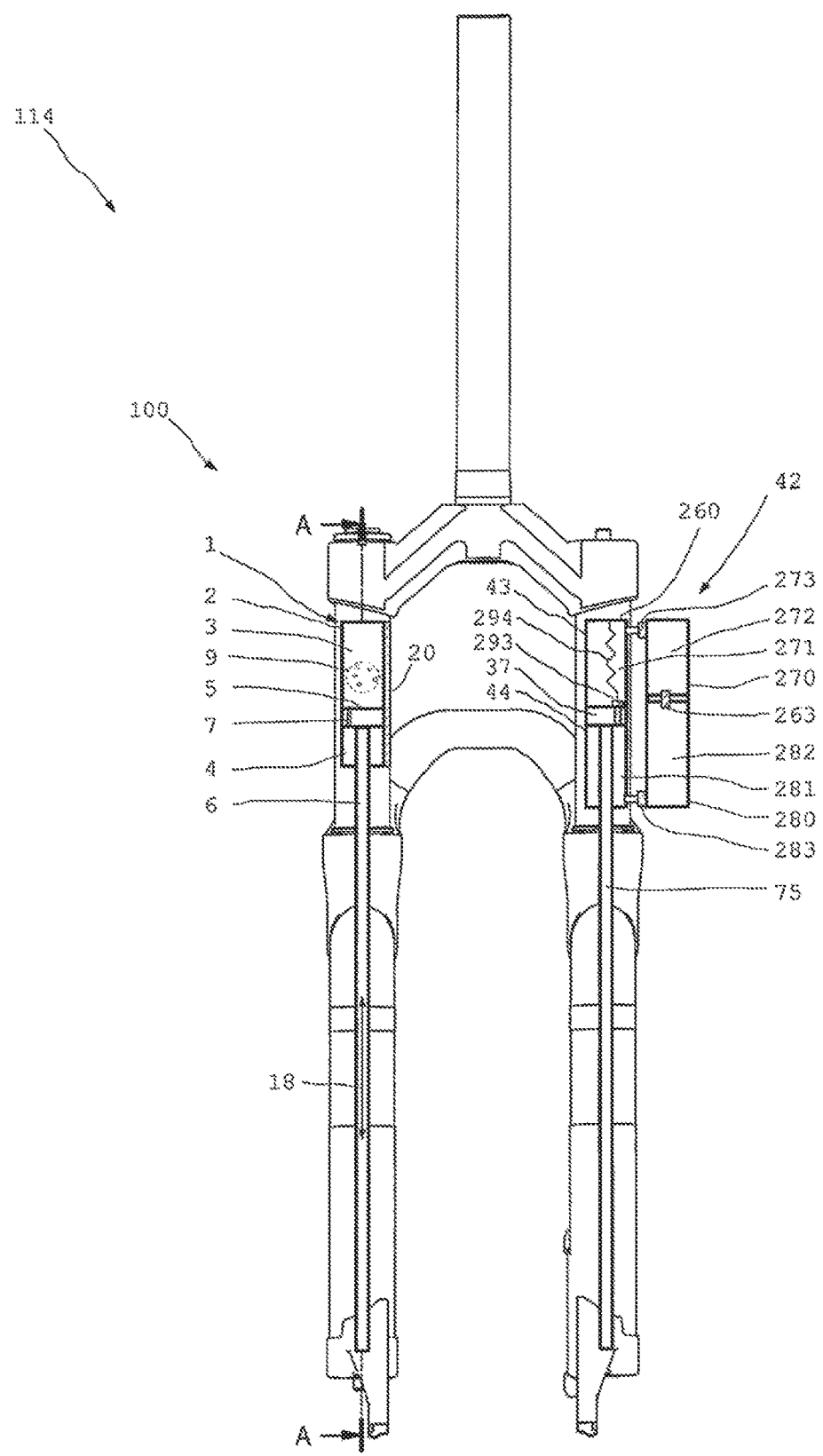
FIG. 3a shows a schematic view of a suspension fork of the bicycle according to FIG. 1.
Figure 3B:
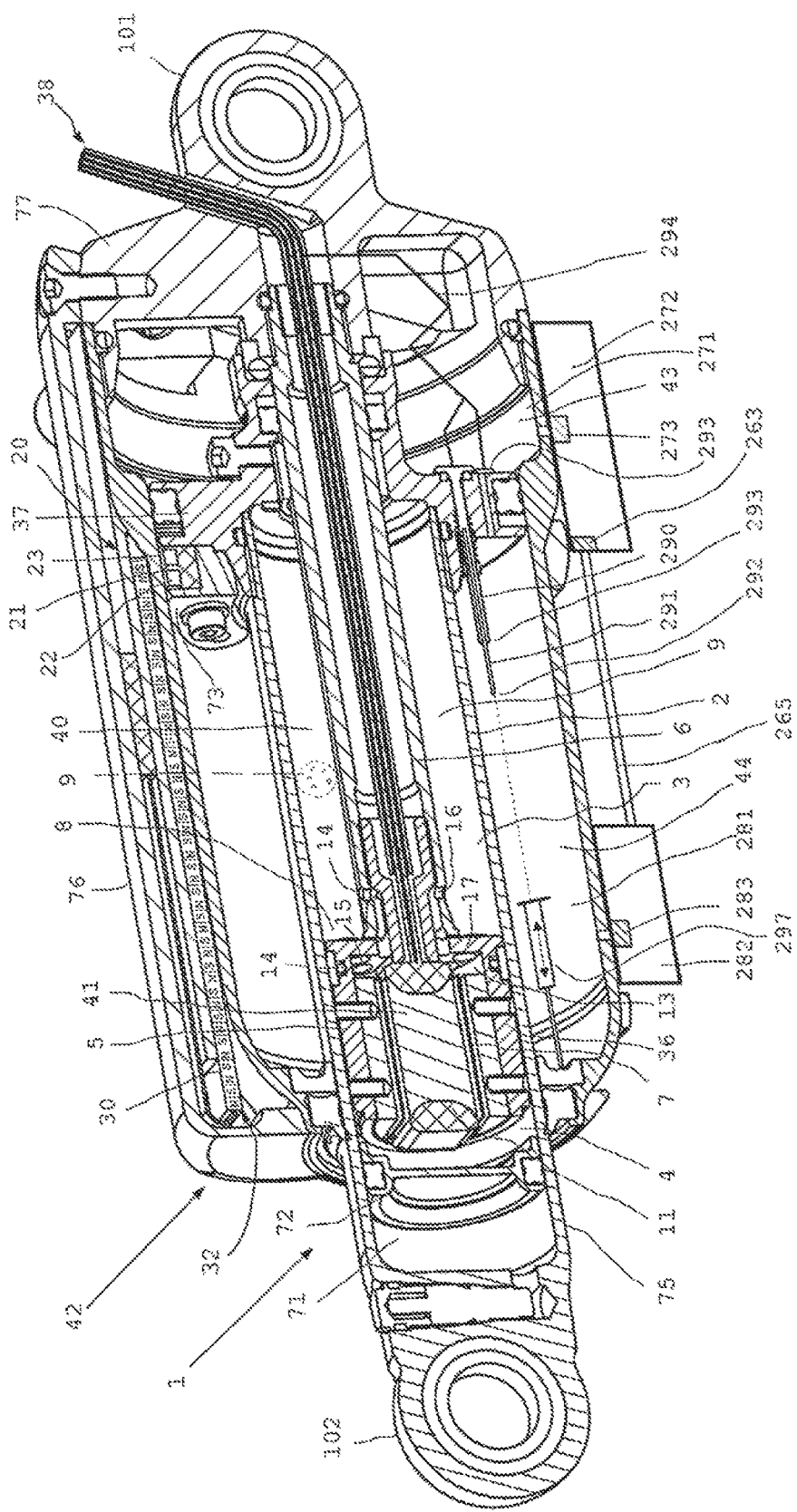
FIG. 3b shows a schematic sectional view of a shock absorber for the rear wheel of the bicycle according to FIG. 1.

FIG. 3a shows, in a highly schematic view, a suspension fork 114 which is applied for the front wheel 111, and FIG. 3b shows the rear wheel damper 115, which are described together below.

The suspension fork 114 has a shock absorber 100. The shock absorber 100 comprises a damper device 1 in a leg of the suspension fork and a spring device 42 in the other leg of the suspension fork. In other configurations, the damper device 1 and the spring device 42 can also be arranged together in one leg.

The shock absorber 100 is attached by the first end as a connecting unit 101 and the second end as a connecting unit 102 to different parts of the supporting device 120 or of the frame 113, in order to provide suspension and damping of relative movements.

The damper device 1 comprises a first damper chamber 3 and a second damper chamber 4 in a common damper housing 2. The two damper chambers 3 and 4 are separated from one another by the damper piston or damping piston 5, in or on which a magneto-rheological damping valve 8 has a dumping duct 7 through which the magneto-rheological damping fluid 9 (MRF) flows. While the damper housing 2 is attached to the upper part of the suspension fork 114 and therefore to the frame 113, the damper piston 5 is connected to the lower drop-out via the piston rod 6.

The spring device 42, which comprises here a spring unit 260 embodied as a fluid spring, is arranged in the other suspension strut of the suspension fork. The spring device has a housing in which the suspension piston 37 separates a positive chamber 270 from a negative chamber 280. The positive chamber 270 forms a positive spring and the negative chamber 280 forms a negative spring, the spring force of which is usually lower in the position of rest, but with which the spring force of the positive spring is opposed. As a result, a good response behavior is achieved, since the fluid spring reacts even in the case of small shocks. The fluid spring is filled with a fluid, here with gas, preferably air.

The positive spring comprises here two partial chambers 271 and 272 which can be separated from one another or connected to one another as necessary by a control valve 273.

The negative spring comprises here two partial chambers 281 and 282 which can be separated from one another or connected to one another as necessary by a control valve 283.

The partial chamber 272 of the positive chamber 270 and the partial chamber 282 of the negative chamber 280 can be connected to one another via the control valve 263. As a result, it is possible to use the control valves 263, 273 and 283 to perform pressure equalization between the positive chamber and the negative chamber at any desired spring position, as a result of which the respective characteristic of the fluid spring is changed. The control valves 263, 273 and 283 serve here as actuators which are activated under the control of the control device 60. As a result, the position of rest can be freely set, and a suspension fork can also be lowered, for example in the case of uphill travel. In the case of a rear wheel shock absorber, an additional volume which is, under certain circumstances, present, in a partial chamber can be eliminated by switching, and the suspension at the rear wheel can therefore be given a harder setting for uphill travel. It is possible to provide just one of the control valves 263, 273 and 283. For example, it is possible to provide only the control valve 273 (or 283), with the result that the volume of the positive chamber 270 (negative chamber 280) and therefore the spring characteristic of the spring unit 260 is changed by opening or closing the control valve 273 (or 283).

It is also possible for the suspension fork 114 to have just one control valve 293 in the suspension piston 37, which control valve 293 is connected to the control device 60 via a cable or a control line 294. By opening the control valve 293 it is possible to permit gas to be exchanged at any desired axial position of the suspension piston 37. Pressure equalization at a suitable location changes the position of rest and brings about e.g. lowering or transfer into the normal position if the suspension fork was lowered.

Through suitable control of the control valves it is also possible to influence the pressure level in the positive and/or negative chamber.

FIG. 3*b* shows, in a highly schematic view, a cross-section through a shock absorber 100, which is used here, for example, in the rear wheel damper 115.

The shock absorber 100 comprises a damper device 1. The shock absorber 100 is attached by the first end as a component 101 and the second end as a component 102 to different parts of the supporting device 120 or of the frame 113, in order to provide damping of relative movements.

A damping piston unit 40, which comprises a damping piston 5 with a damping valve 8 and a piston rod 6 connected thereto, is provided in the damper housing 2. The magneto-rheological damping valve 8 is provided in the damping piston 5, said damping valve 8 comprising here a field-generating device 26 and, in particular, an electrical coil 11, in order to generate a corresponding field strength. The magnetic field lines run here in the central region of the core 41 approximately perpendicularly to the longitudinal extent of the piston rod 6 and therefore pass approximately perpendicularly through the damping ducts 7. This causes the magneto-rheological fluid located in the damping ducts 7 to be effectively influenced, with the result that the through-flow through the damping valve 8 can be effectively damped. The shock absorber 100 comprises a first damper chamber 3 and a second damper chamber 4 which are separated from one another by the damping valve 8 which is embodied as a piston 5. In other configurations, an external damper valve 8 is also possible, said damper valve 8 being arranged outside the damper housing 2 and being connected via corresponding feed lines.

Toward the end 102, the first damper chamber 4 is adjoined by the equalization piston 72 and then by the equalization space 71. The equalization space 71 is preferably filled with a gas and serves to compensate the piston rod volume which enters the entire damper housing 2 when spring compression occurs.

Overall, magneto-rheological fluid 9 is located here as a field-sensitive medium not only in the damping valve 8 but also here in the two damping chambers 3 and 4.

The flow duct 7 between the first damper chamber 3 and the second damper chamber 4 extends from the second damper chamber 4 first through the fan-like damping ducts 7 which open at the other end into the collecting space 13 or into the collecting spaces 13. The magneto-rheological fluid collects there after exiting the damping ducts 7 before said fluid passes over into the first damping chamber 3 through the flow openings 14, 15. During spring compression, that is to say in the pressure stage, there is a flow through all the flow openings 14, 15 here. This means that the main part of the flow here passes through the flow openings 15, and the one-way valves 17 at the flow openings 15 open automatically, with the result that the magneto-rheological fluid can pass over from the second damper chamber 4 into the first damper chamber 3.

In the illustrated spring-compression state, the first damper chamber 3 is surrounded completely in the radial direction by the second spring chamber 44 of the spring device 42. As a result, a particularly compact design is made possible.

The shock absorber 100 can comprise an equalization device 290 which permits pressure equalization between the positive chamber 270 and the negative chamber 280. The position of the pressure equalization can be adjustable. For this purpose, the equalization device 290 can have e.g. a telescopic equalization plunger 291 which can be extended more or less from the suspension piston 37. As a result, the extendable equalization plunger 291 reaches a stop at the end of the negative chamber 280 earlier (or later). The equalization device 290 can be connected to the control device 46 or 60 via an electrical cable 294. If the equalization plunger 291 is triggered, it opens a fluid opening, with the result that gas equalization and therefore pressure equalization takes place between the positive chamber 270 and the negative chamber 280.

During the spring extension, the equalization device 290 closes again automatically. Depending on the position of the equalization, different pressure ratios, which correspondingly influence the chassis, are set at the fluid spring. It is also possible that an adjustable or movable stop for a fixed equalization plunger 291 is provided at the end of the negative chamber 280 in order to bring about variation of the spring characteristic. Alternatively or additionally to this, it is possible to provide a length-adjustable stop 297 against which the equalization plunger 291 abuts in an adjustable and variable position 292. If the equalization plunger 291 abuts, the equalization plunger 291 opens the control valve 293 and forms a flow opening through which a pressure equalization between the positive and negative chambers can take place. FIG. 3*b* shows a position 292 with the equalization plunger 291 extended. The equalization plunger 291 can also be retracted, resulting in a different position in which the equalization device 290 opens. A spring preferably acts on the equalization plunger 291.

Furthermore, an electrically controllable equalization valve 293, supplied with energy e.g. via the electrical cable 294, can also be provided in order to carry out partial or complete pressure equalization between the positive chamber 270 and the negative chamber 280 at suitable positions.

Furthermore, the positive chamber 270 can be composed of a plurality of partial chambers 271, 272. The partial chamber 272 can be connected when necessary or on request to the basic chamber as a partial chamber 271 in order to change the spring hardness and, in particular, reduce it. Conversely, the partial chamber 272 can also be switched off and disconnected from the partial chamber 271 if the spring hardness is to be changed, and in particular increased.

Analogously to this, the negative chamber 280 can be composed of a plurality of partial chambers 281, 282. The second partial chamber 282 can be connected to the first partial chamber 281 when necessary or on request. Correspondingly, the partial chamber 282 can also be switched off and disconnected from the partial chamber 281. In a further configuration, the positive chamber 270 comprises partial chambers 271 and 272, and the negative chamber 280 comprises partial chambers 281 and 282. The equalization device 290 comprises in this configuration control valves 273, 283 and 263 and a connecting line 265 which connects the partial chambers 271 and 282 to one another as required. If the three control valves 273, 283 and 263 are opened, pressure equalization takes place between the positive chamber 270 and the negative chamber 280. The position 292 of pressure equalization can be selected here as desired and independently of an equalization plunger 291. Therefore, in such a configuration there is no need to provide an equalization plunger 291, a control valve 293 in the piston 37 or an adjustable stop 297. The suspension piston 37 is provided at the end of the damper housing 2.

In all cases, the connection and disconnection of the partial chambers can also be carried out as a function of the position during the spring compression or spring extension.

Both the shock absorber of the suspension fork 114 and the shock absorber for the rear wheel each have a sensor device 20 here. The sensor device 20 comprises in each case a detector head 21 and a scaling device 30 embodied in a structured fashion.

The scaling device 30 comprises here a sensor belt with permanent magnetic units as a field-generating unit. The poles of the permanent magnetic units alternate with the result that alternating north and south poles are arranged in the direction of movement of the detector 22. The magnetic field strength is evaluated by the detector head and the position 19 is determined therefrom. The design and function of the sensor device 20 will be explained in more detail below.

Figure 4:
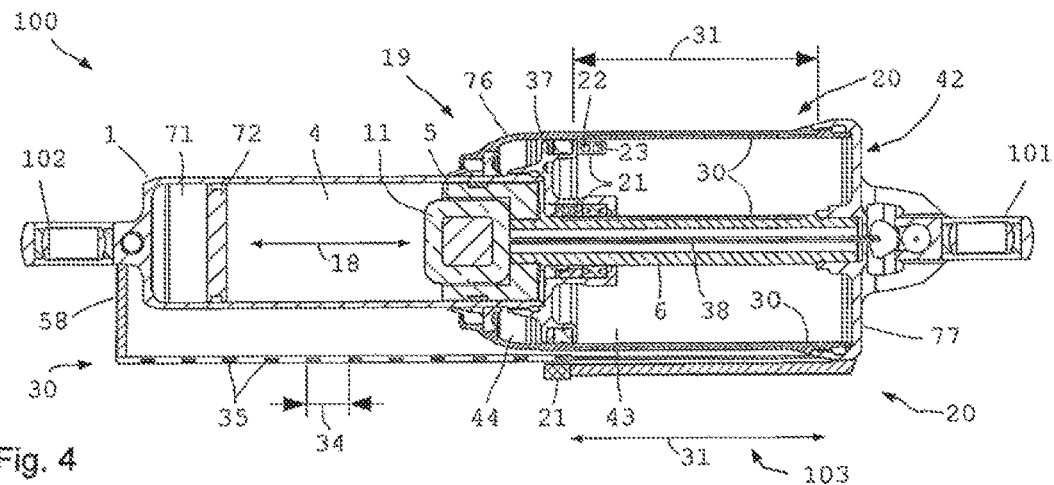
FIG. 4 shows a schematic sectional illustration of a further shock absorber for the bicycle according to FIG. 1.

A further exemplary embodiment of a shock absorber 100 is illustrated in FIG. 4, wherein for the sake of better clarity different variants of a sensor device 20, of which generally only one is installed, are shown.

The shock absorber 100 extends here between the connecting units 101 and 102 provided at the ends and comprises a damper device 1 and a spring device 42, which is embodied as an air spring and comprises a positive chamber 43 and a negative chamber 44. The damper device 1 comprises a first damper chamber 3 and a second damper chamber 4 which are separated from one another by a damping piston 5. A damping valve 8, or at least one damping valve 8, is provided in the damping piston 5 (outside the sectional plane and therefore not visible in FIG. 4). The damping valve 8 or the "open state" of the damping valve is actuated by means of an electrical coil device 11. The coil of the electrical coil device 11 is not wound around the piston rod 6 in the circumferential direction but rather about an axis extending transversely with respect to the longitudinal extent of the piston rod 6. A relative movement takes place here linearly and occurs in the direction of movement 18.

An equalization piston 72, which disconnects an equalization space 71, filled, in particular, with gas, for the volume of the piston rod is arranged in the damper housing 2.

The spring device 42 extends at least partially around the damper device 1 and comprises a spring housing 76. One end of the damper device 1 is connected to a suspension piston 7 30 or forms such a suspension piston 7. The suspension piston 7 separates the positive chamber 43 from a negative chamber 44.

The spring housing 76 is closed off with respect to the end of the connecting unit 101 by a cover 77. The connecting cable 38 for the electrical coil device 11 is also led out there. An electrical connecting cable for the sensor device 20 is also preferably led to the outside there.

The sensor device 20 comprises two sensor parts, specifically the detector head 21, which in the variant illustrated above the centerline is arranged inside the positive chamber 43 of the spring device 42. The sensor device 20 comprises as a further sensor part the scaling device 30 which is arranged or held on the spring housing 76 in different variants. Depending on the configuration and selection of material of the spring housing 76 and depending on the measuring principle of the sensor device 20, the scaling device 30 can be integrated into the internal or external wall or centrally into the wall of the spring housing 76. The scaling device 30 is preferably arranged on the inner wall of the spring housing 76, but can also be attached to or mounted on the outside of the spring housing 76.

Four variants are illustrated. In a first variant, the scaling device 30 is attached to the outside of the spring housing 76 and let, in particular, into a groove on the outside of the spring housing 76. The detector head 21 is located a relatively long way in the radial direction toward the outside in the positive chamber 43 of the spring device 42.

In a second illustrated variant, the scaling device 30 on the inside of the spring housing 76 is let in e.g. a groove on the inside of the spring housing 76 or directly into the wall of the spring housing 76. The detector head 21 is also located inside the positive chamber 43 of the spring device 42 a long way in the radial direction toward the outside.

In a third illustrated variant, the scaling device 30 is integrated into the piston rod of the suspension piston. The detector head 21 is also located inside the positive chamber 43 of the spring device 42, but preferably further toward the inside in the radial direction in this variant.

In the fourth illustrated variant, the scaling device 30 and the detector head 21 are located radially outside the spring housing 76.

In every case, the detector head 21 preferably comprises (at least) two detectors 22 and 23, which are arranged offset with respect to one another in the direction of movement 18 here. In every case, the scaling device 30 has a structure 32 which extends over a measuring section 31 and over which the physical properties of the scaling device 30 change periodically. Sensor sections 33 (cf. FIGS. 5 to 8) are preferably arranged on the scaling device 30 and have electrical and/or magnetic properties which respectively repeat and therefore form the structure 32 of the scaling device 30.

In this context it is possible, as already illustrated in FIG. 3b, for the scaling device 30 to have a multiplicity of permanent magnets whose poles are arranged in an alternating fashion, with the result that a north pole and a south pole alternate with one another.

In such a configuration, the detector head 21 is equipped with detectors 22 and 23 which detect a magnetic field. For example, the detectors 22 and 23 can be embodied as electrical coils or, for example, as Hall sensors in order to detect the intensity of a magnetic field.

If a relative movement of the connecting units 101 and 102 of the shock absorber 100 with respect to one another now takes place, the position 19 of the shock absorber 100 changes and the relative position of the detector head 21 relative to the scaling device 30 shifts. By evaluating the signal strength of a detector 22, 23 and, in particular, of at least two detectors 22, 23 it is therefore possible to infer the relative position of the detector head 21 relative to a sensor section 33 or with respect to the scaling device 30 or the absolute position within a sensor section 33. If two detectors are arranged offset with respect to one another in the direction of movement 18 and if both detectors detect the magnetic field of the scaling device 30, the position 19 and the direction of movement 18 can be determined very precisely by evaluating the signals.

During the continuous movement, the number of sensor sections or periods passed is stored in the memory device 45 of the control device 46, with the result that the absolute position 19 can be inferred. All that is required for this is for the measuring frequency to be so high that a complete sensor section is not moved past "unnoticed" during a measuring cycle.

In the variant in which the sensor device 20 is arranged completely outside the damper housing 2 and the spring housing 76, a mount 58 holds the scaling device 30 and connects the scaling device securely to one end or to a connecting unit 102 of the shock absorber 100. The detector head 21 is connected to the other end or the other connecting unit 101 of the shock absorber 100. The detector head 21 is secured in such a way that it is arranged in a contactless fashion at a short distance from the scaling device 30. In the case of a relative movement of the connecting units of the shock absorber 100, a relative movement of the scaling device 30 relative to the detector head 21 also occurs. A relative position can also be determined here by means of the measuring section 31, which preferably corresponds essentially to the damper stroke 103, by evaluating the field strengths.

By determining the intensity of the field strength it is possible to increase the resolution of the sensor device 20 considerably. In this context it is possible for the resolution for the determination of the position 19 to be smaller than a length 34 of a sensor section 33 by a factor of 50, 100, 500, 1000, 2000 or more. Factors which correspond to a power of 2, for example 128, 256, 512, 1024, 2048, 4096, 8192, 16384 or more are particularly preferred. This facilitates the (digital) processing of signals. As a result, when a structure 32 with sensor sections 33 in the millimeter range is used, a resolution in the micrometer range can be achieved.

The sensor device 20 comprises permanent magnets as field-generating units 35 on the scaling device 30, as illustrated in FIG. 3b. However, it is also possible that other physical and, in particular, magnetic and/or electrical properties also change over the length of the structure 32.

For example, the scaling device 30 can be formed at least partially from a ferromagnetic material, wherein the scaling device 30 has, for example at regular or predetermined intervals, on the ferromagnetic material, prongs, teeth, projections, grooves or other structures which can be used for determining positions. It is also possible for the scaling device to be composed, for example, in its entirety from an insulator 67 into which material conductors 66 are embedded at periodic intervals. The insulator 67 is, in particular, a non-conductor.

Various measuring principles of the sensor device 20 are explained below with reference to FIGS. 5 to 8.

Figure 5:
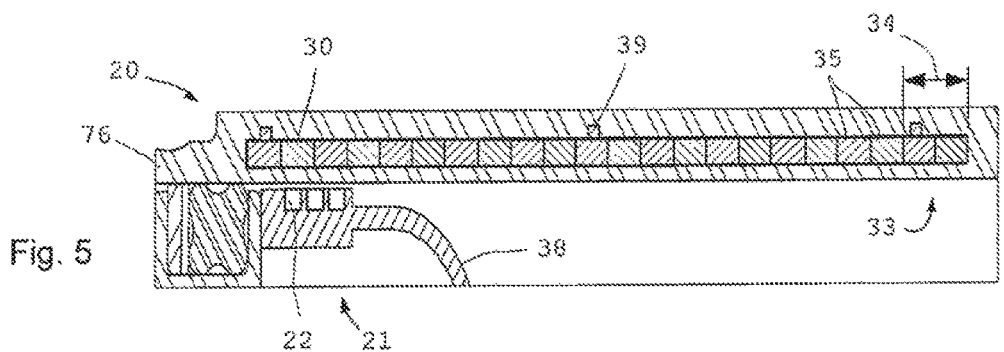
FIG. 5 shows the sensor device of the shock absorber according to FIG. 3a in an enlarged illustration.

In FIG. 5, a variant of the sensor device 20 is shown in which the structure 30 has permanent magnets as field-generating units 35. In this context, the poles of the field-generating units 35 are preferably arranged in an alternating fashion with the result that a magnetic field which changes periodically is produced over the measuring section 31 of the scaling device 30.

In FIG. 5, the detector head 21 is arranged in the interior of the spring housing 76, and the scaling device 30 is located integrated into the spring housing 76. Position marks 39 or the like are provided at specific intervals in order to make available specific calibration points for the calibration of the absolute position or else to permit absolute determination of positions by means of specific encoding operations. Separate end position sensors can also be provided in all cases.

The scaling device 30 can be composed of individual permanent magnets or embodied as a single magnet with alternating magnetization. A magnetic strip, made, for example, from plastic-bound magnetic material, is preferably used as the scaling device 30.

The scaling device 30 can be, in particular, part of the spring housing 76 or of some other part of the damper device 1 if this part is composed at least partially from a material with hard magnetic properties. In this case, the relative, and in certain designs also absolute, determination of positions can be carried out by means of locally different magnetization of the material.

One preferred embodiment provides for the scaling device 30 to be applied in the form of a hard magnetic coating to the spring housing 76. In this context, layer thicknesses of less than 1 mm or less than 100 μm and, in particular, less than 10 μm can be achieved and are sufficient for the determination of positions.

Figure 6:
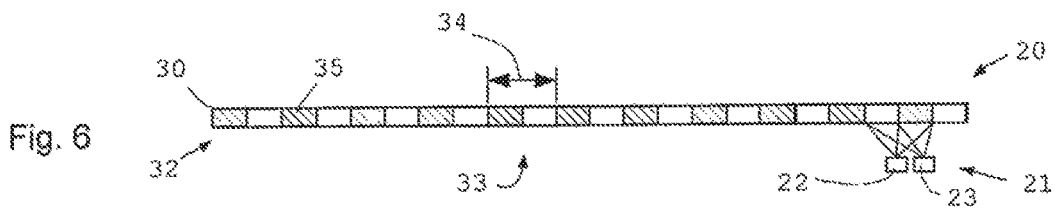
FIG. 6 shows an alternative sensor device for the shock absorbers of the bicycle according to FIG. 1.

FIG. 6 shows a variant in which permanent magnets 35 are also arranged at regular intervals on the scaling device 30. For example, in each case a non-magnetic material is provided between the permanent magnets 35. This also results in a periodically changing intensity of the magnetic field over the measuring section 31 of the scaling device 30. A detector head 21, also with two detectors 22, 23 here, is shown in a highly schematic form, wherein the detection angle is shown for the two detectors, in order to clarify that different intensities during the measurement are obtained with these detectors 22, 23 which are arranged offset in the direction of movement 18.

Figure 7:
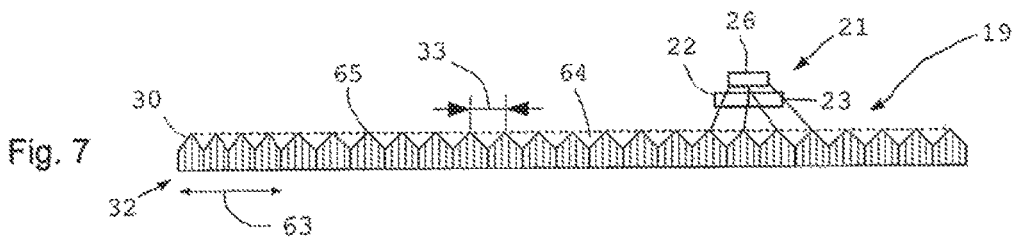
FIG. 7 shows a further sensor device for the shock absorbers of the bicycle according to FIG. 1.

FIG. 7 shows another configuration of the sensor device 20, in the structured scaling device 30 is, for example, embodied in a ferromagnetic fashion and does not make available a separate magnetic field, or essentially makes no such field available. Here, the outer shape of the ferromagnetic part of the scaling device 30 is provided with a regular structure, wherein tips 65 or prongs or other projections or depressions are provided at regular and/or predetermined intervals. The length 34 of a sensor section 33 is obtained here from the distance between two tips 65 or prongs or the like. In order to make available a smooth surface, the intermediate space between the tips 65 can be filled with a filler material 64.

In this variant, the detector head 21 preferably comprises in turn two magnetic field sensors or detectors 22 and 23. In addition, a magnetic field-generating device 26 is provided in the form of, for example, a permanent magnet. The magnetic field of the magnetic field-generating device 26 is influenced or "bent" by the structure 32 of the scaling device 30, with the result that different field strengths of the magnetic field of the magnetic field-generating device 26 are also produced here as a function of the position of the individual detectors 22 and 23, and said field strengths are detected by the detectors 22, 23. The detectors 22, 23 can also be embodied here, for example, as electrical coils or Hall sensors or the like.

At this point it is noted that in all configurations and exemplary embodiments the structure 32 of the scaling device 30 does not necessarily have to have the same lengths 34 of the sensor sections 33. It is also possible for some of the sensor sections 33 to have, for example, relatively short (or relatively long) sensor sections in one section 63. It is also possible for each individual sensor sections 33 to have a different length. Different lengths of the sensor section 33 can be appropriate, for example, in order to bring about automatically a higher resolution in the vicinity of an endpoint. Conversely, in other regions a relatively large distance or relatively large length of a sensor section 33 may be provided in order to make the sensor device 20 less sensitive there.

One preferred embodiment provides for the scaling device 30 to be configured in such a way that two or more parallel paths, which act as individual scales, run in the direction of movement 18. In this context, individual scales do not have to act uniformly over the entire length of the movement, for example when they are used as an index at the ends. The detector head 30 is then correspondingly configured and has at least one additional detector 22.

In this context, the position of the detector head 30 can also be determined absolutely by using two or more paths in the scaling device 30: either by means of digital encoding or else two paths with differing lengths of the respective sensor sections 33, similarly to the nonius in the case of calipers.

Figure 8:
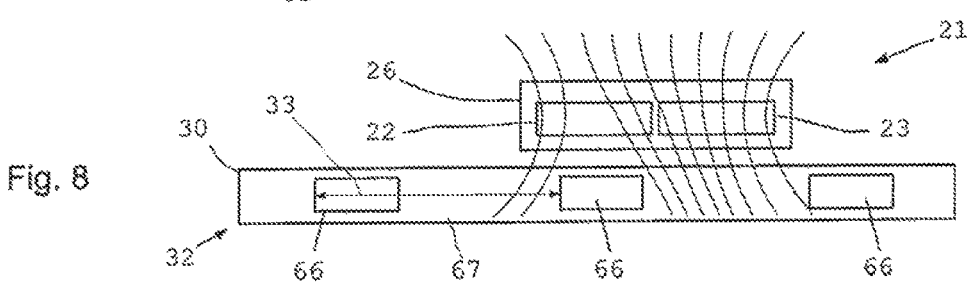
FIG. 8 shows another sensor device for the shock absorbers of the bicycle according to FIG. 1.

FIG. 8 also shows a configuration of a sensor device 20 in which the scaling device 30 does not have any magnetic parts here. The scaling device 30 has again a structure 32, wherein conductors 66 are inserted here at periodic intervals into a material which is non-conductive per se or a non-conductor 67. A length 34 of a sensor section 33 is also determined here by means of the distance between two conductors 66.

The detector head 21 has in this exemplary embodiment a magnetic field-generating device 26 which is designed to make available a magnetic alternating field. Furthermore, the detector head has at least one detector and, in particular, at least two detectors 22, 23 which are used in turn to detect magnetic fields or the intensity of magnetic fields.

In the case of the sensor device 20 in the exemplary embodiment according to FIG. 8, the magnetic field-generating device 26 generates an, in particular high-frequency, magnetic alternating field. As a result, eddy currents are generated in the conductors 66 and they in turn induce in the conductors 66 magnetic fields which are directed counter to the exciting magnetic field. As a result, the magnetic field is expelled from the conductors 66 and amplified between the conductors 66, with the result that in the illustration according to FIG. 8 the detector 23 receives a stronger signal than the detector 22. In the case of a further relative shift of the detector head 21 relative to the scaling device 30, the magnetic conditions change as a function of the position, with the result that the position 19 can be derived by means of the signals of the detectors 22, 23. Furthermore, it is also possible to infer the direction of movement 18.

Figure 9:
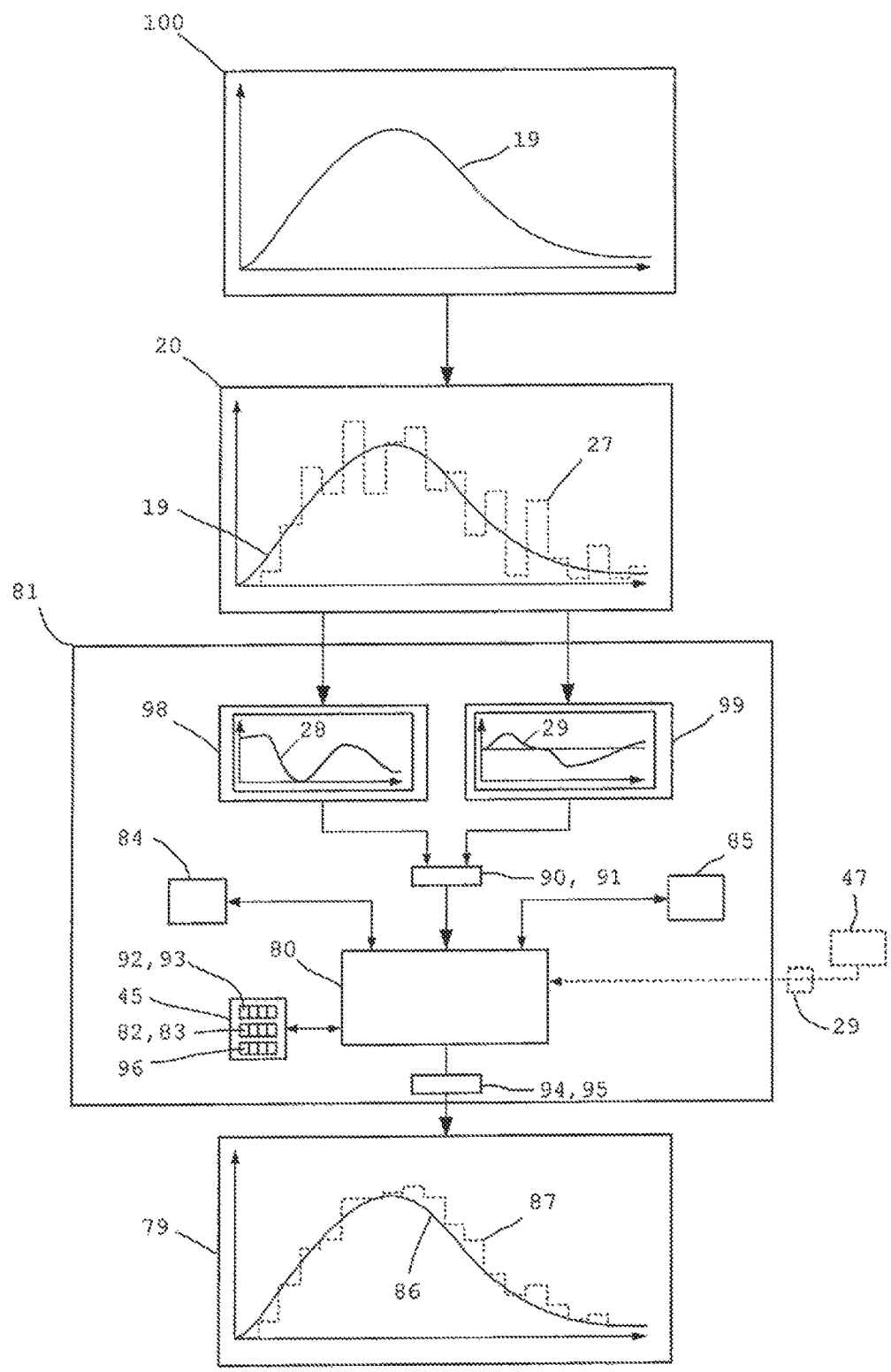
FIG. 9 shows a schematic illustration of the data preprocessing of the data measured with the sensor device.

The measured values which are obtained by means of the sensor device 20 are pre-processed according to the sequence illustrated in FIG. 9 in order to control at least one shock absorber 100 therewith.

The shock absorber 100 experiences a spring compression in the event of shocks, with the result that the position 19 of the connecting units 101, 102 relative to one another changes correspondingly. The sensor device 20 operates primarily as a travel sensor and derives a corresponding signal profile of the sensor signals 27 from the time profile of the position 19. In this context, the signal is digitized and already experiences digitization noise as a result. Furthermore, other effects can also contribute to the production and/or increase of the noise. Unsuitable filtering can also amplify the noise. Therefore, a suitable algorithm is important.

After the detection of the travel signal 27, the travel signal 27 of the speed signal 28 is differentiated in a computing unit 98 in order to obtain said speed signal 28. In addition, in a computing unit 99 for determining an acceleration signal 29 either the travel signal 27 can be derived twice or the speed signal 28 is derived once in order to obtain the acceleration signal 29.

The speed signal 28 and the acceleration signal 29 form together a measured value data set 90, or a measured value data set 91 at the next pass. The measured value data sets are fed to a filter device 80 and can be stored directly in a memory device 45. The measured value data sets 90, 91 are analyzed successively in the filter device 80. A corresponding filter parameter set 82 or 83 etc. is selected or derived as a function of the values of a measured value data set 90, and a control data set 94 is derived from the measured value data set 90 with the corresponding determined filter parameter set 82, 83 using a suitable filter algorithm.

It is possible and preferred that in the case of a measurement data set 91 the filter parameter set is determined with the preceding measurement data set 90, since owing to the high measuring frequency it is assumed that from one measurement data set to the next measurement data set the values do not change to such an extent that it is necessary to re-determine a filter parameter set.

However, it is also possible and preferred that a measurement data set 91 is stored in a pre-processed form or in a direct, non-pre-processed form in the memory device 45 as a stored data set 93. A filter parameter set 82, 83 can be selected with the data set 93 which is now stored. Using the filter parameter set, a corresponding control data set 95 can be calculated with the corresponding filter, for example a Kalman filter 84 or an average value former 85 or some other filter algorithm or with other filter devices.

After the calculation of the control data set 95, it can be iteratively checked whether the associated filter parameter set was the correct filter parameter set. In any case or in many cases or when certain deviations are exceeded, renewed determination of a suitable filter parameter set can be carried out in order therefore subsequently to derive the current control data set 95 again. Such iteration can take place once or can be carried out repeatedly and can be limited to a maximum number of passes.

In addition, an acceleration signal 29 of a separate acceleration sensor 47 can also be fed to the filter device. Therefore, the acceleration of the two-wheeled vehicle can also be taken into account overall.

During the determination of a suitable filter parameter set 82, 83, it is possible that two or more different filter parameter sets 82, 83 are provided, wherein the selection of a filter parameter set 82, 83 preferably takes place according to whether the speed signal exceeds a specific value or not. In addition, it is possible and is particularly preferred also to use the acceleration signal to decide about a suitable filter parameter set.

In the exemplary embodiment, both the speed signal and acceleration signal are used to select a suitable filter parameter set.

In simple cases, filtering is carried out by forming average values, wherein different filter parameter sets can differ by virtue of the fact that the number of measured values taken into account is varied. If, for example, low speeds and low acceleration values are present, more measured values can also be taken into account from the past than in the case of high speeds or high accelerations, since otherwise in the case of high speeds and high accelerations a significant and, under certain circumstances, damaging delay can occur during the reaction of the shock absorber 100. Conversely, relatively strong smoothing of measured values in the case of low speeds and low accelerations causes digitization noise to be filtered out more strongly, as a result of which the response behavior remains clean even in the case of small and very small shocks.

Finally, FIG. 9 is a diagram 79 in which the real speed 86 and the speed 87 used for control are plotted schematically. The deviations between the curves are small as a result of the analysis of the measured values and the corresponding consideration of a filter parameter set.

A Kalman filter is particularly preferably used in all the configurations. The filter parameter set is determined for the preferred Kalman filter as follows:

The (noisy) measured speed "Vr" and the (noisy) measured acceleration "Ar" of the connecting units with respect to one another are transferred to the filter algorithm here. The values for Vr and Ar are measured by the sensor device 20 or derived therefrom. The speed signal and the acceleration signal can be derived from the sensor signal. The acceleration signal can also be determined directly by means of a separate acceleration sensor 47.

The estimated or derived speed "Vg" (reference symbol 87) and, if appropriate, the estimated acceleration "Ag" of the relative movement of the connecting units are determined from the above using the Kalman filter. Here, the values Vr and Ar are specified in SI units and consequently in "m/s" and "m/s2", respectively.

At first, variables "Q0" and "R" and "Vg" and "P" are defined. At the first pass of the filter algorithm, starting values are defined, here preferably Q0=0.01 and R=5 and Vg=0 and P=1 are set. Vg corresponds to the estimated or derived speed 87 of the relative movement of the connecting units with respect to one another, said speed 87 being used for the determination of the damping.

Subsequently, at each pass the filter parameter set is determined, and values are determined for Q, Pp, K, Vg and P. The parameters of the filter parameter set 82, 83 depend on the measured (noisy) values. In this respect, it is decided whether the mathematical absolute value of the acceleration "Ar" which is measured (with noise) is larger than a predefined threshold value, preferably 5 here. The speed "Vg" which is estimated or derived in the previous pass (from the stored data set 92), is defined as a value Vp by means of Vp=Vg (from the last loop).

Furthermore, it is determined whether the mathematical absolute value of the value Vp (estimated speed Vg of the relative movement of the connecting units with respect to one another in the last pass) is higher than a further threshold value, preferably 0.1 here.

Even if only one of the conditions applies, the parameter "Q" is set to a predefined value, here Q=2. If no condition applies, Q is set to another predefined value, specifically here to Q=Q0 and therefore to Q=0.01.

After this, values Pp, K, Vg and P are determined as $Pp=P+Q.$ $K=Pp*1/(Pp+R)$ $Vg=Vp+K*(Vr-Vp)$ $P=(1-K)*Pp$ An estimated speed "Vg" (reference symbol 87 in FIG. 8) is fed back as a result of the filter algorithm or the filter function. An estimated acceleration "Ag" can also be determined and fed back. The filter parameters and calculated values are stored as a filter parameter set 83 at least up to the next pass. At the next pass, the filter parameter set 83 becomes the filter parameter set 82.

The speed 87 is then used for control.

Figure 10A:
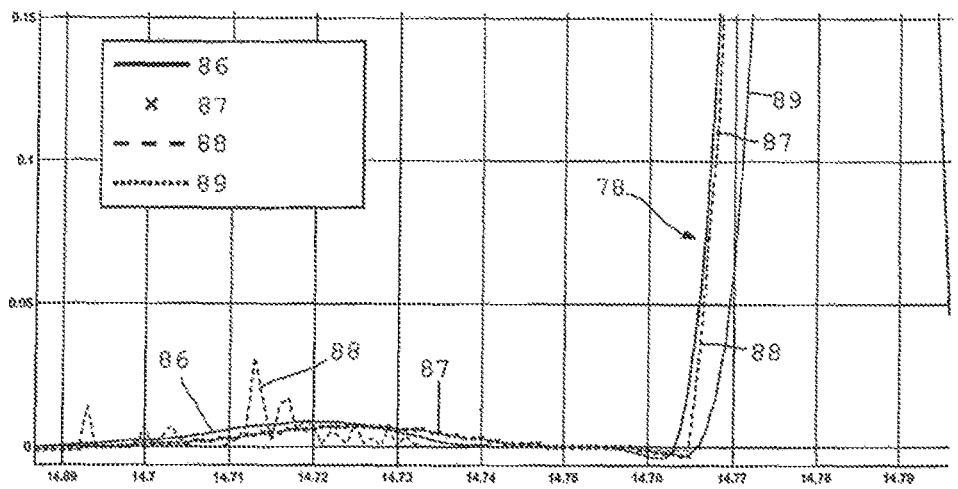
FIGS. 10a to 10c show real measurement data of the shock absorber according to FIG. 4.
Figure 10B:
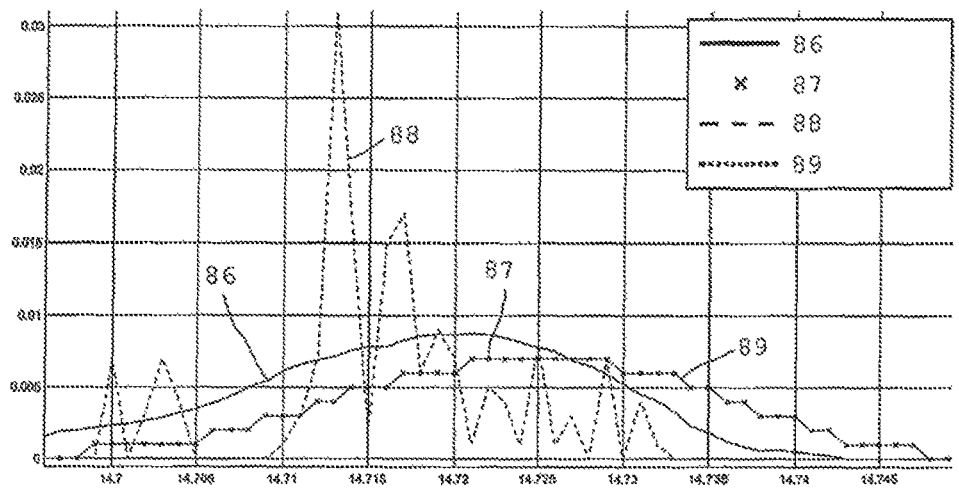
Figure 10C:
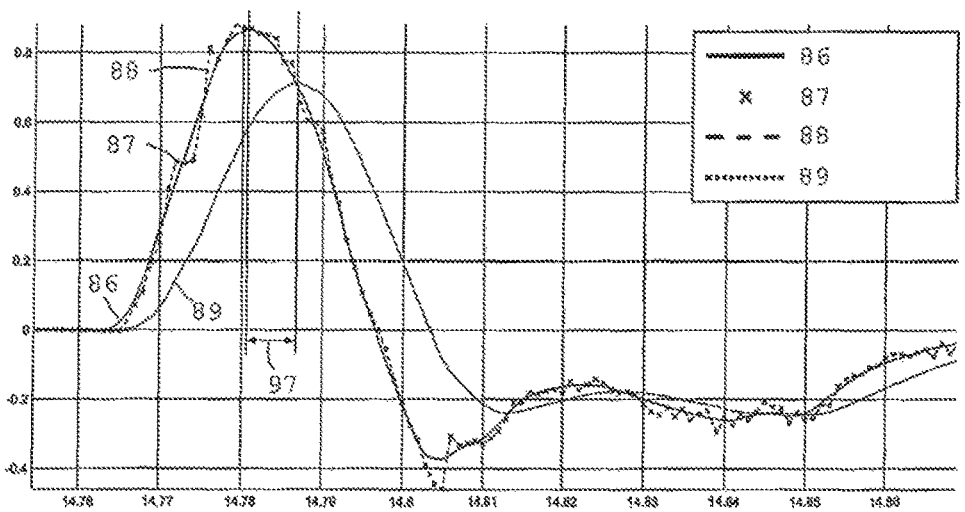

Finally, real values which have been recorded with the shock absorber according to FIG. 4 are plotted in FIGS. 10a to 10c.

In this context, FIG. 10a shows the time sequence over somewhat more than one 10th of a second, within which initially only very low speeds are present, while a relatively large shock occurs toward the end of the displayed time period.

The real speed 86, which was also determined by means of additional sensors and which was subsequently determined in a costly fashion after the measurement, is shown by a continuous line. In the normal travel mode, the real speed 86 is not available with the measuring quality for the control. The real speed 86 is presented here only for the purpose of comparison.

The dashed line 88 shows the speed 88 which was filtered with a first filter parameter set 82 and at the start of the illustrated measuring time period deviates considerably from the real speed 86.

The dotted line 89 shows the speed profile which was determined with a second filter parameter set 83 with relatively strong filtering. At the start of the measuring time period, the curve 89 shows a considerably smoother profile than the curve 88 illustrated by a dashed line. The deviations from the profile of the real speed 86 are relatively small. Although a slight time offset can be seen, it is not significant in the case of these small shocks.

At the start of a relatively strong shock at approximately 14.76 seconds, the profile of the real speed 86 rises very steeply. The dashed curve 88 follows the real speed profile 86 virtually without delay, while the dotted line 89 has a significant time offset.

As a result of the criteria of the analysis of the measured values, switching over of the filter parameter sets is carried out here during the processing of the measured values, wherein up to approximately 14.765 seconds the dotted curve profile 89 is used for the control, and in which switching from the curve 89 to the curve 88 takes place starting at approximately 14.765 seconds. The switching time 78 is shown. At this time, the measured speed and/or the measured acceleration have exceeded a predetermined amount, and a different filter parameter set is therefore selected. In all cases, more than two filter parameter sets are also possible, for example one with low filtering or smoothing, one with medium filtering or smoothing and one with relatively strong filtering or smoothing.

The control profile is represented by the crosses 87 which are shown, wherein the crosses 87 firstly lie on the curve 89 (relatively strong smoothing) and later on the curve 88 (relatively weak smoothing). It is therefore possible for sufficient correspondence and high accuracy to be achieved over the entire measuring range.

In particularly simple cases, for example relatively strong smoothing can comprise simple averaging of the last five or ten measured values, while in the case of relatively weak smoothing only the last two or three values are averaged. In this context, the intensity of the weighting can depend on the time interval (weighting of, for example, 25%, 50 and 100% for the penultimate measured value, the last measured value and the current value).

FIG. 10b shows the first time segment from FIG. 9 in an enlarged view, with the result that the deviations of curve 88 from the real speed profile 86 can be seen very clearly. At the time of approximately 14.713 seconds on the curve 88, a speed value which is four times as high as the speed value which is actually present in reality is output. At this time, a deviation of the curve 89 from the real speed 86 is very much smaller.

FIG. 10c shows the profile of the relatively strong shock at the end of the time period illustrated in FIG. 10a, wherein a good degree of correspondence between the curve profiles 88 and the real speed profile 86 can be seen here. The time offset 97 between the maximum of the real speed profile 86 and the maximum of the curve 89 is much more than 5 ms and is too large to be able to make available optimum damping properties for such shocks.

Overall, the invention provides a sufficiently fast and smooth response behavior which is respectively adapted, and therefore an improved chassis controller 300 in all power ranges of the shock absorbers 100, by means of a sensor device 20 with high measuring resolution and by means of the filtering of the measurement data, wherein the filter parameters are selected as a function of the measurement data.

LIST OF REFERENCE SYMBOLS

1 Damper device
2 Damper housing
3 First damper chamber
7 Second damper chamber
5 Damping piston unit
6 Piston rod
7 Damping duct, flow duct
8 Damping valve
9 MRF
10 Damper characteristic curve
11 Electrical coil device
12 Control circuit
13 Collecting space
14,15 Flow opening
16 Through-opening
17 One-way valve
18 Direction of movement
19 Position
20 Sensor device
21 Detector head
22,23 Detector
26 Magnetic field-generating device
27 Sensor signal
28 Speed signal
29 Acceleration signal
30 Scaling device
31 Measuring section
32 Structure
33 Sensor section
34 Length
35 Field-generating
36 Annular conductor
37 Suspension piston
38 Cable
39 Position mark
40 Damping piston unit
41 Core
42 Spring device
43 Positive chamber
44 Negative chamber
45 Memory device
46 Control device
47 Acceleration sensor
48 Data
49 Display
50 Damper characteristic curve
52 Step
53 Internet
54 Network interface
55 Radio network interface
56 Step
57 Touchscreen, graphic operator control unit
58 Mount
60 Control device
61 Battery unit
63 Section
64 Filler material
65 Tip
66 Conductor
67 Insulator
70 Step
71 Equalization space
72 Equalization piston
73 Mount
75 Piston rod
76 Spring housing
77 Cover
78 Switching point
79 Diagram
80 Filter device
81 Analysis device
82,83 Filter parameter set
84 Kalman filter
85 Average value former
86 Real speed
87 Speed used
88,89 Speed
90,91 Measurement data set
92,93 Stored data set
94,95 Control data set
96 Limiting value set
97 Time offset
98,99 Computing unit
100 Shock absorber
101,102 Connecting unit
103 Damper stroke
111 Wheel, front wheel
112 Wheel, rear wheel
113 Frame
114 Suspension fork
115 Rear wheel damper
116 Handlebars
117 Saddle
120 Supporting device
150 Operator control device
151 Activation device
152 Adjustment device
153 Mechanical input unit
154-156 Operator control element
160 Smart phone
161-162 Region
200 Two-wheeled vehicle
260 Spring unit
263 Control valve
265 Line
270 Positive chamber
271,272 Partial chamber
273 Control valve
280 Negative chamber
281,282 Partial chamber
283 Control valve
290 Equalization device
291 Equalization plunger
292 Position
293 Equalization valve
294 Cable, control line
297 Stop
300 Chassis controller
401 Bicycle component
408 Detection device
413 Transmitter unit 418 Memory device
423 Receiver unit
424 Ultrasound sensor
433 Mounting device
434 Infrared sensor
444 Radar sensor

The invention claimed is:

1. A chassis controller for an at least partially human-powered two-wheeled vehicle, comprising:
 a control device and at least one memory device connected to said control device;
 at least one controllable shock absorber having two connecting units disposed to move relative to one another;
 at least one sensor device for acquiring measurement data sets relating to a relative movement of said connecting units with respect to one another;
 a filter device connected to said at least one sensor device and configured for pre-processing the measurement data sets;
 wherein at least one data set, derived from a measurement data set acquired with said sensor device during the relative movement of said connecting units is stored in said memory device;
 an analysis device connected to said memory device and configured to analyze at least one stored data set and to determine a filter parameter set based on an analysis result and to derive a control data set from the measurement data set with a filter parameter set; and
 wherein said control device controls said shock absorber with the control data set.

2. The chassis controller according to claim 1, wherein a multiplicity of filter parameter sets are stored in said memory device, and wherein a filter parameter set can be selected as a function of the at least one stored data set.

3. The chassis controller according to claim 1, wherein said analysis device comprises a comparator device configured to compare at least one stored data set with comparison data and to select, based on a comparison result, a filter parameter set stored in said memory device, and wherein said comparator device derives a control data set from the measurement data set.

4. The chassis controller according to claim 1, wherein said memory device is configured to store a multiplicity of data sets.

5. The chassis controller according to claim 1, wherein said control device is configured to derive a speed signal for a relative movement of said connecting units from a sensor signal.

6. The chassis controller according to claim 1, wherein said control device is configured:
 to select a filter parameter set with stronger filtering in a case of speed signals and acceleration signals which are low in absolute value; and
 to select a filter parameter set with less filtering in a case of speed signals or acceleration signals which are relatively high in absolute value.

7. The chassis controller according to claim 1, wherein said control device is configured to derive an acceleration signal from a sensor signal.

8. The chassis controller according to claim 1, wherein said sensor device is configured to acquire a travel signal.

9. The chassis controller according to claim 1, wherein said sensor device is configured to acquire the travel signal with a resolution of better than 100 µm.

10. The chassis controller according to claim 1, wherein said sensor device is configured for acquiring the sensor signal with a measuring frequency of at least 1 kHz.

11. The chassis controller according to claim 1, comprising a damper device connected to one of said two connecting units and having a first damper chamber, at least one second damper chamber, and at least one damping valve, wherein said first and second damper chambers communicate with one another via said at least one damping valve.

12. The chassis controller according to claim 11, which comprises a magnetic field-generating device disposed to generate and control a magnetic field in at least one damping duct of said damping valve, and a magneto-rheological medium contained in said at least one damping duct.

13. A method for controlling a part of a chassis of an at least partially human-powered two-wheeled vehicle, the vehicle having at least one control device and at least one memory device and having at least one controllable shock absorber formed with two connecting units that can move relative to one another, the method comprising:
 acquiring measurement data sets relating to a relative movement of the connecting units with respect to one another and pre-processing the measurement data sets with a filter device;
 storing a data set derived from an acquired measurement data set in a memory device;
 analyzing a stored data set and determining a filter parameter set as a function of an analysis result;
 deriving a control data set from the measurement data set with a filter parameter set; and
 controlling the shock absorber with the control data set.

14. The method according to claim 13, which comprises deriving signals selected from the group consisting of speed signals and acceleration signals from the measurement data set.

15. The method according to claim 13, which comprises filtering a measurement data set more strongly if an absolute value of the values of the measurement data set is relatively lower than when the absolute value of the values of the measurement data set is relatively higher.

16. The method according to claim 15, which comprises more strongly filtering in a case of low speed signals than in a case of high-speed signals, and more strongly filtering in a case of relatively low acceleration signals than in a case of relatively high acceleration signals.

17. The method according to claim 13, which comprises storing a plurality of successively acquired data sets.

18. The method according to claim 13, wherein the control data set is determined by smoothing a plurality of data sets.

19. The method according to claim 18, which comprises adjusting an intensity of the smoothing in dependence on the stored data set.

20. The method according to claim 13, which comprises acquiring the measurement data sets with a sensor device at a measuring frequency of higher than 1 kHz or determining control data sets with the control device at a given control frequency of higher than 1 kHz and actuating the shock absorber with the control device at least temporarily with at least the given control frequency.

21. The method according to claim 20, wherein one or both of the measuring frequency and the control frequency are greater than 5 kHz.

22. The method according to claim 20, which comprises acquiring travel signals with the sensor device at a resolution of less than 100 µm or less than 50 µm.

23. The method according to claim 22, wherein the measuring frequency and the control frequency are at least temporarily higher than 8 kHz and the resolution of the travel signals is at least temporarily less than 5 µm.

24. The method according to claim 20, which comprises setting the measuring frequency to less than 50 kHz or less than 20 kHz.

\* \* \* \* \*